US006975755B1

(12) United States Patent
Baumberg

(10) Patent No.: US 6,975,755 B1
(45) Date of Patent: Dec. 13, 2005

(54) IMAGE PROCESSING METHOD AND APPARATUS

(75) Inventor: Adam Michael Baumberg, Guildford (GB)

(73) Assignee: Canon Kabushiki Kaisha, Tokyo (JP)

( * ) Notice: Subject to any disclaimer, the term of this patent is extended or adjusted under 35 U.S.C. 154(b) by 733 days.

(21) Appl. No.: 09/718,343

(22) Filed: Nov. 24, 2000

(30) Foreign Application Priority Data

| Nov. 25, 1999 | (GB) | ................................ | 9927906 |
| Nov. 25, 1999 | (GB) | ................................ | 9927907 |
| Nov. 25, 1999 | (GB) | ................................ | 9927909 |
| Aug. 3, 2000 | (GB) | ................................ | 0019080 |
| Aug. 3, 2000 | (GB) | ................................ | 0019086 |
| Aug. 3, 2000 | (GB) | ................................ | 0019087 |

(51) Int. Cl.$^7$ .......................... G06K 9/00; G06T 15/00
(52) U.S. Cl. ...................... 382/154; 382/285; 382/294; 345/419; 356/12; 348/42
(58) Field of Search ............................ 382/154, 285, 382/294, 217, 208; 345/419–427; 356/12–14; 348/42–60; 359/462–477; 352/57–65; 33/20.4; 353/7–9; 378/41–42; 396/324–331

(56) References Cited

U.S. PATENT DOCUMENTS

| 5,073,962 | A | * | 12/1991 | Califano .................... 382/205 |
| 5,101,270 | A | * | 3/1992 | Boone et al. ................. 348/61 |
| 5,132,842 | A | * | 7/1992 | Yeh ............................. 359/561 |
| 5,671,297 | A | | 9/1997 | Koppe et al. ................ 382/293 |
| 5,710,833 | A | | 1/1998 | Moghaddam et al. ....... 382/228 |
| 5,719,954 | A | * | 2/1998 | Onda ........................... 382/154 |
| 5,734,743 | A | * | 3/1998 | Matsugu et al. ............ 382/154 |
| 5,828,769 | A | | 10/1998 | Burns .......................... 328/118 |
| 5,848,193 | A | | 12/1998 | Garcia ......................... 382/232 |
| 5,911,005 | A | * | 6/1999 | Uchiyama .................... 382/187 |
| 5,974,192 | A | * | 10/1999 | Kundu ......................... 382/260 |
| 5,991,429 | A | * | 11/1999 | Coffin et al. ................ 382/118 |
| 6,266,452 | B1 | * | 7/2001 | McGuire ..................... 382/294 |
| 6,282,317 | B1 | * | 8/2001 | Luo et al. .................... 382/203 |

(Continued)

FOREIGN PATENT DOCUMENTS

EP 0898245 2/1999 ............ G06T 7/00

(Continued)

OTHER PUBLICATIONS

Cohen et al., "Hierarchical Region Based Stereo Matching", 1989, IEEE, pp. 416-421.*

(Continued)

Primary Examiner—Bhavesh M. Mehta
Assistant Examiner—Aaron Carter
(74) Attorney, Agent, or Firm—Fitzpatrick, Cella, Harper & Scinto

(57) ABSTRACT

An apparatus (2) for matching features in images of objects taken from different viewpoints is provided comprising: an image buffer (60) for receiving image data; and output buffer (62) for outputting pairs of matched features and processing means (64–78) for processing received image data to determine matched pairs of features in images. The processing means (64–78) includes a detection module (72) for detecting features at a number of different scales to account for the possibility that a feature in one image may correspond to a larger or smaller feature in another image; a characterization module (74) for generating characterization data for selected features where the characterization data is substantially independent of changes of scale, and the effects of stretch and skew resulting from viewing objects from different viewpoints; and a matching module (76) for outputting as pairs of matched features, features which most closely correspond to each other which are unambiguously better matches than any alternative match between features in different images.

74 Claims, 17 Drawing Sheets

U.S. PATENT DOCUMENTS 6,381,346 B1 * 4/2002 Eraslan ................ 382/118
6,744,909 B1 * 6/2004 Kostrzewski et al. ....... 382/115

FOREIGN PATENT DOCUMENTS

EP 0901105 3/1999 ............ G06T 7/00
WO WO 93/15474 8/1993 ............ G06K 9/00

OTHER PUBLICATIONS

Chung, "Rigidity Constraints across Two Views under Weak Perspective", 1995, IEEE, pp. 2730-2735.*

Saint-Marc et al., "Adaptive Smoothing: A General Took for Early Vision", Jun. 1991, IEEE Transactions on Pattern Analysis and Machine Intelligence, vol. 13, No. 6, pp. 514-529.*

"Calibration of Image Sequences For Model Visualisation", A. Broadhurst et al., 1999 IEEE Computer Society Conference On Computer Vision and Pattern Recognition, vol. 1, pp. 100-105, Jun. 23-25, 1999, Fort Collins, Colorado.

"Efficient Bundle Adjustment With Virtual Key Frames: A Hierarchical Approach To Multi-Frame Structure From Motion", Heung-Yeung Shum et al., 1999 IEEE Computer Society Conference On Computer Vision and Pattern Recognition, vol. 2, pp. 538-543, Jun. 23-25, 1999, Fort Collins, Colorado.

"A Robust Technique For Matching Two Uncalibrated Images Through The Recovery of The Unknown Epipolar Geometry", Zhengyou Zhang et al., Research Report No. 2273, INRIA Sophia-Antipolis, pp. 15-47, Cedesc (France), 1994.

"Photorealistic Scene Reconstruction by Voxcel Coloring", S. Seitz et al., Proc. Conf. Computer Vision and Pattern Recognition, pp. 1067-1073, 1997.

"Plenoptic Image Editing", S. Seitz et al., Proc. 6th International Conf. On Computer Vision, pp. 17-24.

"Rapid Octree Construction From Image Sequences", R. Szeliski, CVGIP: Image Understanding, vol. 58, No. 1, pp. 23-48, Jul., 1993.

"Polynomial Expansion of Severely Aberrated Wave Fronts", J. Braat, J. Opt. Soc. Am. A, vol. 4, No. 4, pp. 643-650, Apr., 1987.

"Closed-Form Solution of Absolute Orientation Using Unit Quaternions", B. Horn, J. Opt. Soc. Am. A, vol. 4, No. 4, pp. 629-642.

"Shape-adapted smoothing in estimation of 3-D shape cues from affine deformations of local 2-D brightness structure", Tony Lindeberg, Jonas Gårding, Computational Vision and Active Perception Laboratory (CVAP), Department of Numerical Analysis and Computing Science, KTH (Royal Institute of Technology), S-100 44 Stockholm, Sweden, Image and Vision Computer 15 (1997), pp 415-434.

"Affine/Photometric Invariants for Planar Intensity Patterns", Luc Van Gool, Theo Moons and Dorin Ungureanu, Katholieke Universiteit Leuven, ESAT—M12, K. Mercierlaan 94, B-3001 Heverlee, Belgium, pp 642-651.

"Extracting the Affine Transformation from Texture Moments," Jun Sato and Robert Cipolla, Department of Engineering, University of Cambridge, Cambridge CB2 1PZ, England, Lecture Notes in Computer Science, vol. 801, pp 165-172.

"The Revised Fundamental Theorem of Moment Invariants," T H Reiss, IEEE Transactions of Pattern Analysis and Machine Intelligence, vol. 13, No. 8, Aug. 1991, pp 830-834.

"Wide Baseline Stereo Matching", Philip Pritchett and Andrew Zisserman, Robotics Research Group, Department of Engineering Science, Oxford University, OX1 3PJ, pp 754-760.

"A Fast Matching Method for Color Uncalibrated Images using Differential Invariants", V Gouet, P Montesinos, D Pel, British Machine Vision Conference, 1998, vol. 1, pp 367-376.

"Local Grayvalue Invariants for Image Retrieval", Cordelia Schmid and Roger Mohn, IEEE Transactions on Pattern Analysis and Machine Intelligence, vol. 19, No. 5, May 1997, pp 530-535.

* cited by examiner

IMAGE PROCESSING METHOD AND APPARATUS

BACKGROUND OF THE INVENTION

Field of the Invention

The present invention relates to the detection and matching of features in images. The present invention may be used to match features in different images. Alternatively, the invention may be used to identify features in images for the purpose of for example indexing or categorization.

The present invention is particularly suitable for the identification of points within images corresponding to the same physical point of an object seen from two viewpoints. By identifying points within images corresponding to the same physical point on an object, it is possible to establish the relative positions from which image data has been obtained. The image data can then be used to generate a three-dimensional model of the object appearing in the images.

The appearance of an object in an image can change in a number of ways as a result of changes of camera viewpoint. If points in images taken from different camera viewpoints are to be matched, it is necessary to characterize points within images in a way which is not affected by the introduced distortion so that matching is possible.

A number of ways of characterizing features in images have been suggested. One example is the use of rotational invariants suggested by Gouet et al., in "A Fast Matching Method for Colour Uncalibrated Images Using Differential Invariants" British Machine Vision Conference, 98 Volume 1, page 367–376. Gouet suggests characterizing feature points in images using differential texture invariants which are invariant under rotation. In this way, rotation of a camera may be accounted for. Furthermore, small variations in camera position give rise to distortions which may be approximated as rotations and hence the use of rotational invariants is also suitable to account for some other distortions.

However, some changes of viewpoint give rise to distortions which cannot be approximated to rotations. The matching of feature points in such images may therefore be unsatisfactory.

When characterizing points within images it is important that an appropriate portion of an image is used to characterize a feature point so that feature points within different images can be correctly matched and points within images corresponding to the same physical point of an object seen from two viewpoints may be identified.

Furthermore, where one image is taken from a viewpoint that is closer to an object than another, the size of an object will appear to change. Features which are apparent when an object is viewed closely may cease to be apparent when an object is viewed from further away. Alternatively, large scale features which are visible from a distance may no longer be distinct when viewed closely.

In the majority of feature detection systems for detecting features of interest in images, all features are detected at a single scale. Thus no allowance is made for the fact that features which may be apparent at one scale may not be apparent at either a larger or a smaller scale.

It has been proposed by Lindeberg in "Scale Space Theory in Computer Vision", Kluwer Academic, Dordrecht, Netherlands 1994 that scale could be used in the characterization of features of images. In particular, Lindeberg suggests that by aiming to detect features at all possible scales, the scale at which a feature is most noticeable may be determined. These "scale space" features within images may then be used to classify points within an image.

Where two images are taken at different viewpoints which result in a relative change of scale, the determination of 'scale space' features in the images could theoretically provide information relevant to the determination of the relative camera positions from which the images have been obtained. However, other distortions which arise due to a change in camera position can also affect the strength at which a feature can be detected within an image, and unless the strength of a feature is significantly greater at a single scale, the effect of the noise introduced by these other distortions will prevent the scale at which a 'scale space' feature is most noticeable from being accurately determined.

In one aspect, the present invention aims to provide an apparatus which more accurately matches feature points in images of the same object taken from different viewpoints.

In accordance with this aspect of the present invention there is provided an apparatus for matching features in images comprising:

an image data receiver for receiving image data;
an image data characterizer for characterizing points within images corresponding to received image data; and
a data point matcher for matching points within image data on the basis of the characterization of points characterized by said image data characterizer, characterized in that:
said image data characterizer is arranged to characterize points within images, wherein said characterization is substantially unaffected by affine distortions of a portion of an image centered on said feature point.

When images of planar surfaces are taken from different positions relative to the surface, the surfaces appear to undergo affine transformations. By providing an apparatus which characterizes portions of images in a way which is substantially unaffected by affine distortions the matching of points on planar surfaces of objects in images taken from different view points can be improved.

Another embodiment of the present invention comprises an apparatus for comparing an image against a database of images utilizing apparatus for matching feature points in the images as has been described above.

In a further aspect, the present invention aims to provide apparatus for identifying features which provide an alternative means of selecting feature points utilizing the detection of features at different scales.

In accordance with this further aspect of the present invention there is provided apparatus for characterizing points within images comprising:

an image data receiver for receiving image data;
a scale associater for associating points within an image corresponding to received image data with scale data representative of the size of a portion of said image used to detect the presence of features within said image at said points; and
a data point characterizer for determining for points in an image corresponding to said image data, characterization values for said points on the basis of image data corresponding to a portion of said image centered on said point wherein the size of said portion of said image is dependent upon said scale data associated with said point by said scale associater.

By providing a scale associater for associating points within images with a scale and characterizing a point within an image based upon a portion of the image centered on the selected point where the size of the portion in the image is determined by the associated scale, a means is provided to account for the apparent change of size of objects which can occur due to the change of camera viewpoint. The identification of points within images corresponding to the same physical point on an object where an image is taken from different viewpoints that are closer to or further from an object can therefore be more accurately achieved.

Where the feature point is to be characterized for the purposes of matching or indexing, one way in which points within images may be characterized is by using first order differential rotational texture invariants such as those suggested by Gouet et al in 'A Fast Matching Method for Colour Uncalibrated Images Using Differential Invariants', British Machine Vision Conference, 1998, Vol. 1, page 367–376. Gouet suggests that the use of first order invariants presents two main advantages namely that they provide a robust means for characterizing feature points within images with regards to noise and secondly the complexity of the method is minimized. However only a limited number of first order invariants may be calculated.

In a further aspect, the present invention aims to provide apparatus for calculating other rotational invariants for points within images which enables first and higher order invariants to be calculated easily and in a robust manner.

In accordance with this aspect of the present invention there is provided means for characterizing portions of images comprising:
an image data receiver for receiving image data;
a data point characterizer means for characterizing points within an image corresponding to said image data wherein said characterization comprises the calculation of a set of complex coefficients, $$U_{n,m} = \int \int \frac{d^n}{dr^n} G(r) e^{im\theta} I(r, \theta) dr d\theta$$

where $G(r)$ is a circular symmetric window function, $I(r,\Theta)$ is a portion of said image data centered on a said point; and $0 \leq n \leq n_{max}$, $0 \leq m \leq m_{max}$ and an invariant calculator for determining a set of rotational invariants for said portion of said image data from said calculated set of complex co-efficients.

After feature points have been characterized, it is then necessary to match the characterized feature points either to identify corresponding points in another image or to categorize or index the image. In order to do so, the "best" matches for a feature point must be determined.

For many objects, different parts of an object have a similar appearance. Thus, for example, often all the windows of a house may appear to be substantially identical, as may the different branches on a tree. By providing an apparatus which selects a set of matched features on the basis of the lack of ambiguity of a match, a means is provided to reduce erroneous matches.

Zhang et al. in 'Robust Technique for Matching Two Uncalibrated Images Through the Recovery of Unknown Epipolar Geometry' research report No. 2273, INRIA Sophia-Antipolis, Cedex (France), 1994 proposed an improved method by which feature points in pairs of images can be matched. Zhang et al. proposed that in addition to selecting matches on the basis of the correlation between characterization vectors for feature points, the relative ambiguity of matches should also be taken into account. Specifically it was suggested that when the correlation of potential matches is determined the ratio of the correlation of the best match to the second best match for a feature point is stored as an ambiguity measure. The matches for feature points are then selected by determining those feature points in one image which both have strongly correlated characterization vectors and whose ambiguity scores are also relatively low.

In another aspect, the present invention also aims to provide apparatus for matching characterized feature points which provides an improved set of matches compared to the systems of the prior art.

In accordance with this aspect of the present invention there is provided an apparatus for matching feature points in images comprising:
an image data receiver for receiving data representative of images;
a data point characterizer for characterizing feature points in said images; and
feature point associater for matching characterized feature points in one image with characterized feature points in another image, wherein said feature point associater is arranged to determine as an ambiguity score for potential matches for each of said feature points a value indicative of the ratio of the correspondence of the feature point in said another image most strongly corresponding with characterization of said feature point in said one image to the correspondence of the characterization of the feature point in said another image which next most strongly corresponds with the characterization of said feature point in said one image, characterized in that said feature point associater is arranged to output a list of pairs of points wherein said pairs of points comprise points in said one image and points in said another image associated with ambiguity scores indicative that said points in said another image correspond significantly better to said points in said one image than any other of said points in said another image.

In systems which process lists of matched feature points, the processing resulting from the erroneous matching of two points can be significantly greater than the problems arising due to the output of only a limited number of matched points since correct matches can themselves be used to help in the determination of further sets of matched feature points. Where image data is such that features in parts of an image appear similar, erroneous matches are more likely to occur. By providing an apparatus which selects matches for image features solely on the matches being least ambiguous a means is provided for reducing the likelihood that erroneous matching occurs and hence reduce the processing arising from such errors.

An embodiment of the present invention comprises an apparatus for generating three-dimensional computer models of objects from images of objects taken from different viewpoints incorporating an apparatus for matching feature points in images described above.

Another embodiment of the present invention comprises an apparatus for comparing an image against a database of images utilizing apparatus for matching feature points in the images, as has been described above.

In a further aspect the present invention aims to provide an apparatus which enables points within images to be more accurately characterized.

In accordance with this further aspect of the present invention there is provided apparatus for categorizing points within images comprising:
an image data receiver for receiving image data;

a data point characterizer for determining for points within an image corresponding to said image data, characterization values at each of a plurality of scales, wherein a characterization value for a point at a scale is determined on the basis of image data corresponding to a portion of said image centered on said point and the size of said portion of said image is dependent upon said scale; and a selector for selecting a number of feature points on the basis of said determination by said data point characterizer, wherein said data point characterizer further comprises a characterization strength normalizer for calculating normalized characterizing strengths for points within an image to said image data wherein said characterization strength normalizer is arranged to calculate said normalized characterization strengths by increasing or decreasing proportionately said characterization data to account for the variation in characterization values arising due to the variation of the size of the portion of said image from which said characterization values are calculated, wherein said selector is arranged to select said feature points on the basis of normalized characterization strengths.

By calculating values for features in images detected at different scales in a manner which is unaffected by the size of regions used to detect a feature, a means is provided to compare the relative strengths of different sized features. By selecting those feature points having the highest values associated with them, a means is provided to select points for further processing by the apparatus. Since the selection of the points is independent of the size of a feature, where the same feature appears at different scales in two images the values associated with the features should be similar and hence both features should be selected for future processing and possible matching. Thus, in this way, by providing an apparatus to select points in images in a way which enables different sized features to be detected and compared in a manner independent of their apparent size, the selection of feature points for matching points on objects in images where the images may appear at different sizes in different images is facilitated.

Another embodiment of the present invention comprises an apparatus for comparing an image against a database of images utilizing apparatus for matching feature points in the images, as has been described above.

Further aspects and embodiments of the present invention will become apparent when reading the following description with reference to the accompanying drawings in which.

Figure 15:
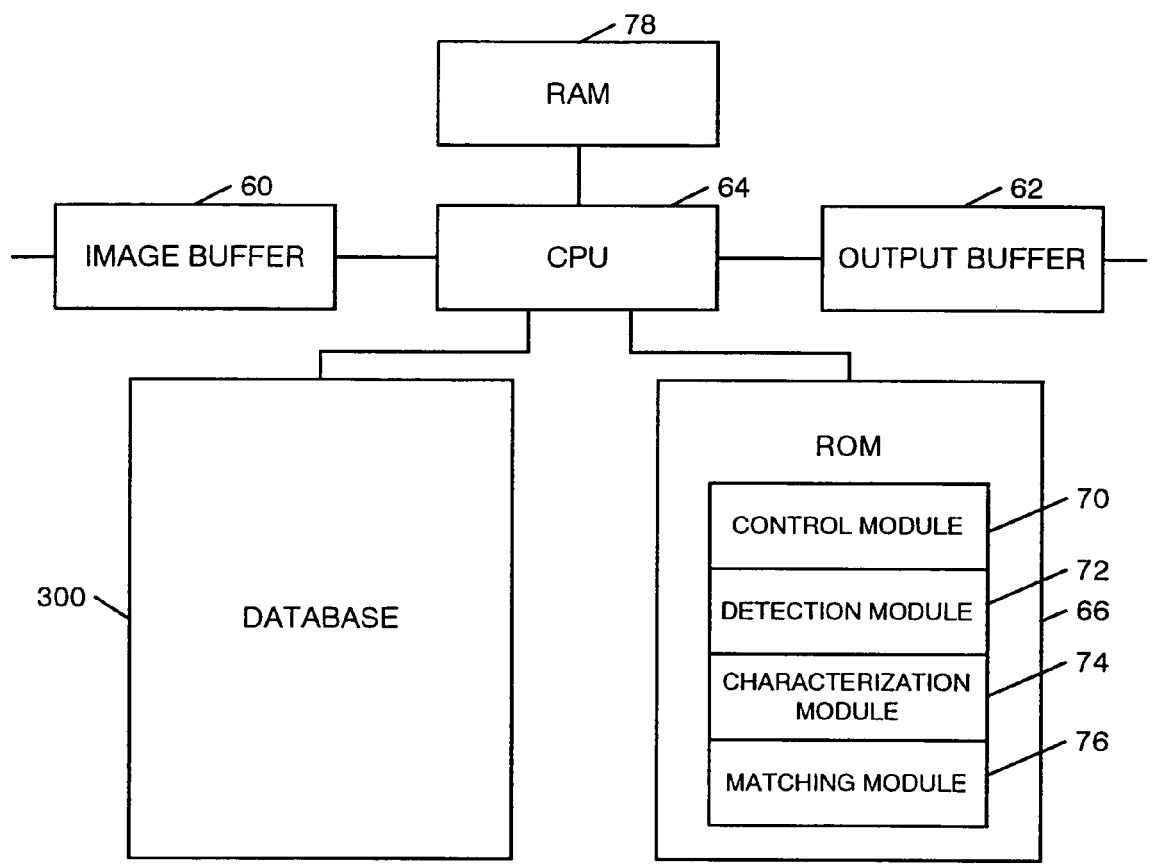
Figure 16:
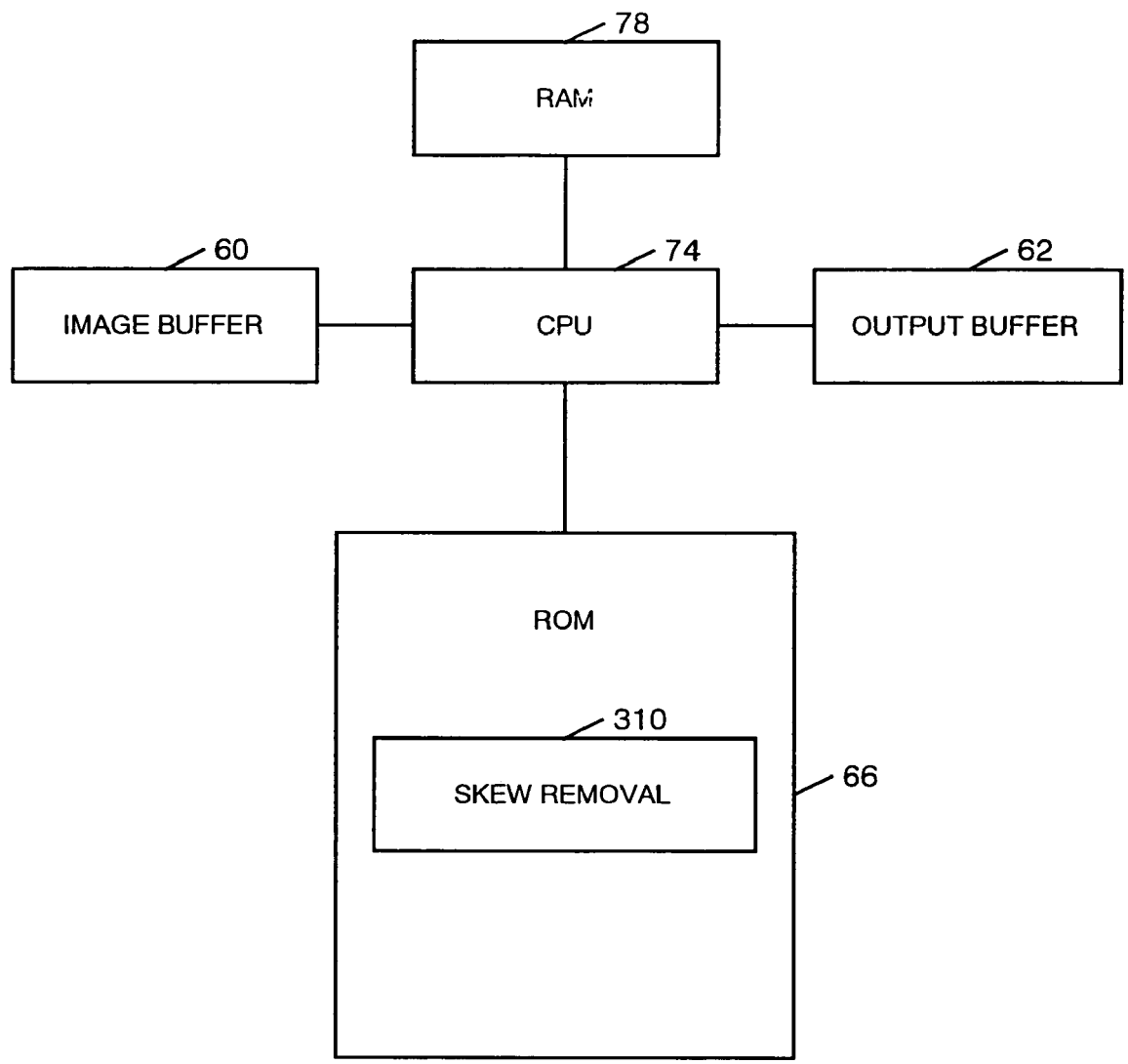

FIG. 15 is a block diagram of an apparatus for retrieving images from a database of images utilizing a characterization and matching module in accordance with a third embodiment of the present invention; and FIG. 16 is a block diagram of an apparatus for generating images in which the effects of stretch and skew resulting from affine transformations of an image are removed in accordance with a fifth embodiment of the present invention.

FIRST EMBODIMENT

Figure 1:
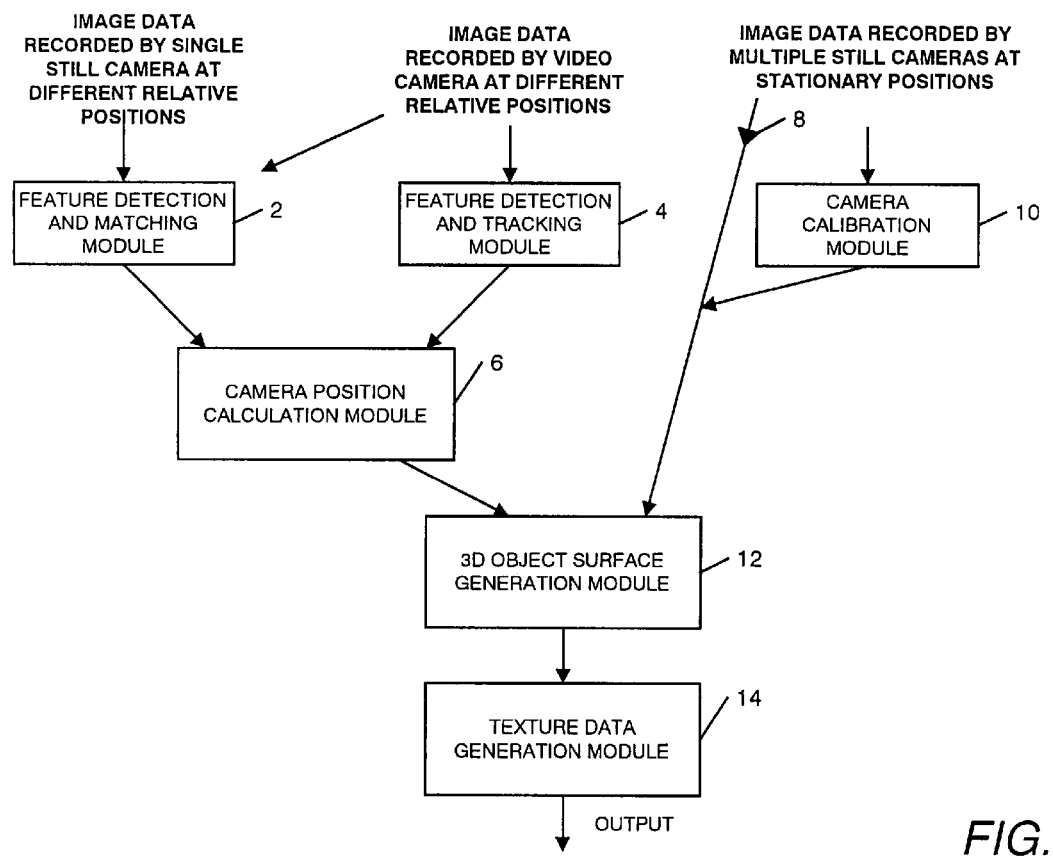
FIG. 1 is a block diagram of a modular system for generating three-dimensional computer models from images of objects in which the present invention may be embodied.

FIG. 1 schematically shows the components of a modular system in which the present invention may be embodied. These components can be effected as processor-implemented instructions, hardware or a combination thereof.

Referring to FIG. 1, the components are arranged to process data defining images (still or moving) of one or more objects in order to generate data defining a three-dimensional computer model of the object(s).

The input image data may be received in a variety of ways, such as directly from one or more digital cameras, via a storage device such as a disk or CD ROM, by digitization of photographs using a scanner, or by downloading image data from a database, for example via a data link such as the Internet, etc.

The generated 3D model data may be used to: display an image of the object(s) from a desired viewing position; control manufacturing equipment to manufacture a model of the object(s), for example by controlling cutting apparatus to cut material to the appropriate dimensions; perform processing to recognize the object(s), for example by comparing it to data stored in a database; carry out processing to measure the object(s), for example by taking absolute measurements to record the size of the object(s), or by comparing the model with models of the object(s) previously generated to determine changes; carry out processing so as to control a robot to navigate around the object(s); store information in a geographic information system (GIS) or other topographic database; or transmit the object data representing the model to a remote processing device for any such processing, either on a storage device or as a signal (for example, the data may be transmitted in virtual reality modeling language (VRML) format over the Internet, enabling to be processed by a WWW browser); etc.

The feature detection and matching module 2 is arranged to receive image data recorded by a still camera from different positions relative to the object(s) (the different positions being achieved by moving the camera and/or the object(s)) or frames from a video camera, where there is an interruption and change of view point within a stream of video images such as arises when a user switches off a video camera and restarts filming an object from a different position. The received data is then processed in order to match features within the different images (that is, to identify points in the images which correspond to the same physical point on the object(s)).

The feature detection and tracking module 4 is arranged to receive image data recorded by a video camera as the relative positions of the camera and object(s) are changed (by moving the video camera and/or the object(s)). As in the feature detection and matching module 2, the feature detection and tracking module 4 detects features, such as corners, in the images. However, the feature detection and tracking module 4 then tracks the detected features between frames of image data in order to determine the positions of the features in other images.

The camera position calculation module 6 is arranged to use the features matched across images by the feature detection and matching module 2 or the feature detection and tracking module 4 to calculate the transformation between the camera positions at which the images were recorded and hence determine the orientation and position of the camera focal plane when each image was recorded.

The feature detection and matching module 2 and the camera position calculation module 6 may be arranged to perform processing in an iterative manner. That is, using camera positions and orientations calculated by the camera position calculation module 6, the feature detection and matching module 2 may detect and match further features in the images using polar geometry in a conventional manner, and the further matched features may then be used by the camera position calculation module 6 to recalculate the camera positions and orientations.

If the positions at which the images were recorded are already known, then, as indicated by arrow 8 in FIG. 1, the image data need not be processed by the feature detection and matching module 2, the feature detection and tracking module 4, or the camera position calculation module 6. For example, the images may be recorded by mounting a number of cameras on a calibrated rig arranged to hold the cameras in known positions relative to the object(s).

Alternatively, it is possible to determine the positions of a plurality of cameras relative to the object(s) by adding calibration markers to the object(s) and calculating the positions of the cameras from the positions of the calibration markers in images recorded by the cameras. The calibration markers may comprise patterns of light projected onto the object(s). Camera calibration module 10 is therefore provided to receive image data from a plurality of cameras at fixed positions showing the object(s) together with calibration markers, and to process the data to determine the positions of the cameras. A preferred method of calculating the positions of the cameras (and also internal parameters of each camera, such as the focal length etc) is described in "Calibrating and 3D Modelling with a Multi-Camera System" by Wiles and Davison in 1999 IEEE Workshop on Multi-View Modelling and Analysis of Visual Scenes, ISBN 0769501109.

The 3D object surface generation module 12 is arranged to receive image data showing the object(s) and data defining the positions at which the images were recorded, and to process the data to generate a 3D computer model representing the actual surface(s) of the object(s), such as a polygon mesh model.

The texture data generation module 14 is arranged to generate texture data for rendering onto the surface model produced by the 3D object surface generation module 12. The texture data is generated from the input image data showing the object(s).

Techniques that can be used to perform the processing in the modules shown in FIG. 1 are described in EP-A-0898245, EP-A-0901105, pending U.S. application Ser. Nos. 09/129,077, 09/129,079 and 09/129,080, the full contents of which are incorporated herein by cross-reference, and also Annex A.

The present invention may be embodied in particular as part of the feature detection and matching module 2 (although it has applicability in other applications, as will be described later).

Prior to describing in detail a feature detection and characterization module 2 in accordance with a first embodiment of the present invention, the problems of accurately matching points within images of an object seen from different viewpoints arising due to the differences in appearance resulting from a change of view point of an object will briefly be discussed.

Figure 2A:
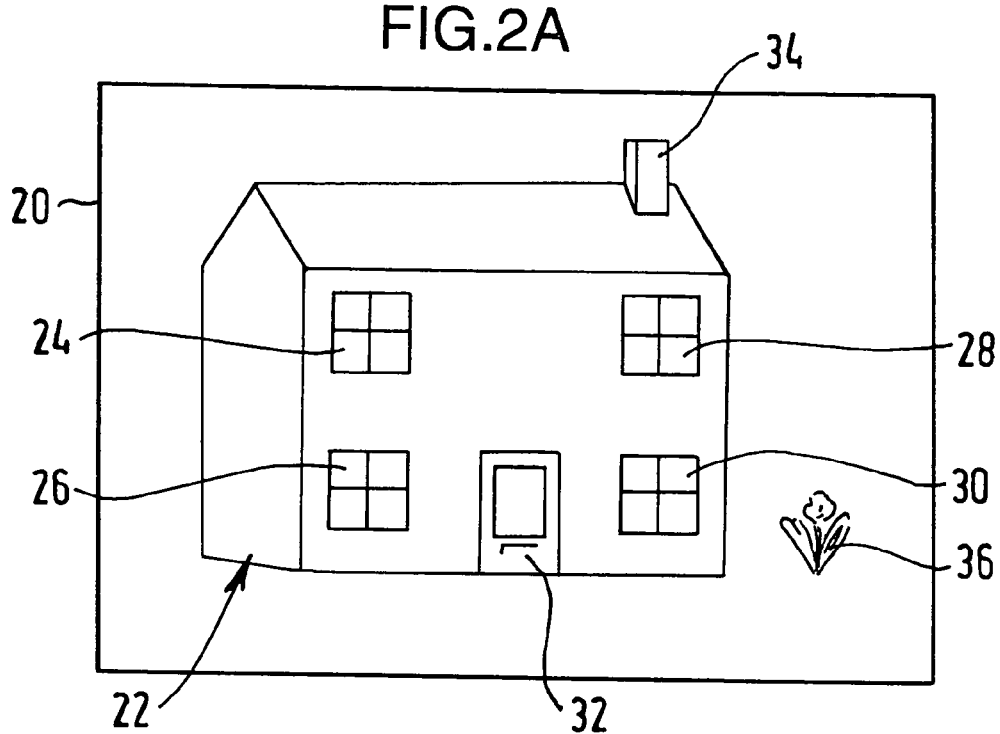
FIGS. 2A and 2B are a pair of illustrative examples of images of an object taken from two different viewpoints.
Figure 2B:
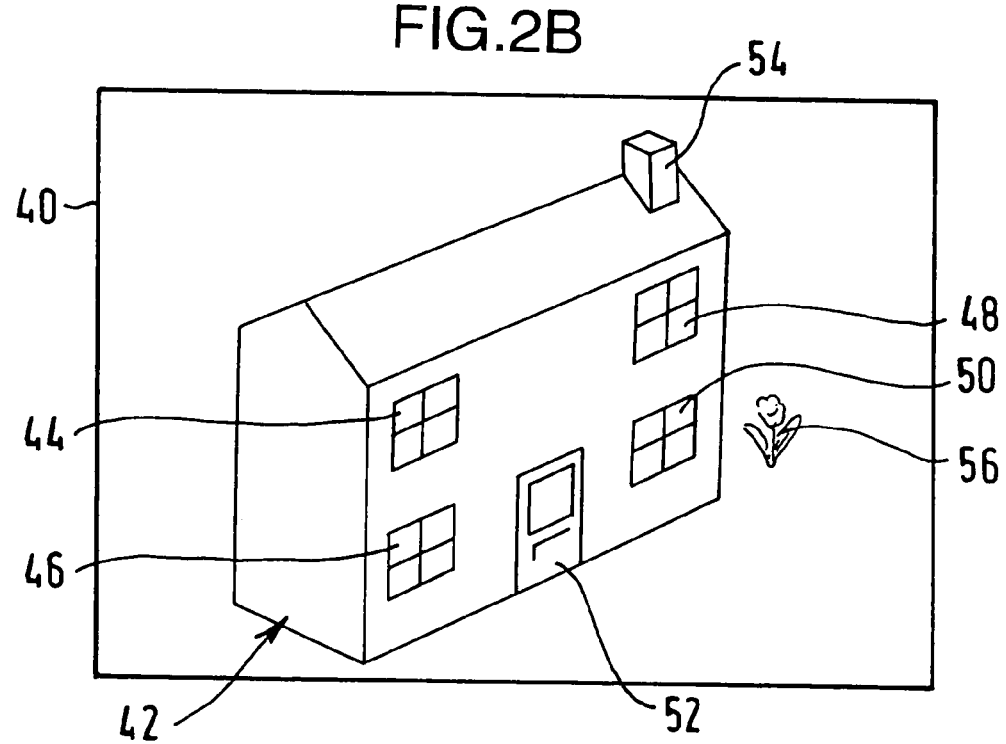

FIGS. 2A and 2B are illustrative examples of two images recorded by a still camera from different positions relative to the same object. In this example the image 20 of FIG. 2A comprises an image of a house 22 as viewed from in front. In the image can be seen four windows 24, 26, 28, 30, a front door 32 and a chimney 34. Next to the house to the right of the house there is a flower 36.

The image 40 of FIG. 2B comprises an image of the same house 42 taken from a viewpoint to the left of the position in which the first image 20 has been taken. Again visible in the image are four windows 44, 46, 48, 50, a front door 52 and a chimney 54. A flower 56 is also visible to the right of the house 42.

As an initial step for establishing the relative camera positions between two images of the same object, it is necessary to establish which points in the images correspond to the same physical points of the objects appearing within the images. Where a sequence of images are taken with a video camera the differences between consecutive images, unless there is an interruption in the video image stream, are usually very small. It is therefore possible, provided there has been no interruption in the video image stream, to constrain the search for points in images which correspond to the same physical point on an object to a small area in the same region of a second image and then determine the effect of moving the camera in terms of a translation applied to pixels within that portion of the image.

In contrast, where a still camera is used to obtain image data of objects from different viewpoints or where a video camera has been switched off between two image frames in the video stream the difference between the view point in two images can be much larger. As the difference in viewpoints increases it is no longer adequate to assume that the change in viewpoint can be approximated as a translation of portions of an image since in addition to translation the parts of an image are also distorted as a result of the change of view point.

Thus, for example, looking at the exemplary images of FIGS. 2A and 2B it is apparent that the square windows 24, 26, 28, 30 appearing in the image 20 of FIG. 2A are stretched and skewed so as to appear as parallelograms 44, 46, 48, 50 in the image 40 of FIG. 2B. This is in addition to the windows 44, 46 on the left hand side of the house being translated further down the image and the window 48, 50 on the right hand side of the house being translated up in the image 40 of FIG. 2B compared to the same windows 24–30 in the image 20 of FIG. 2A. Furthermore, in contrast to the appearance in the image 20 of FIG. 2A, in the image 40 of FIG. 2B because the windows 44, 46 on the left hand side of the house are now closer to the camera than the windows 48, 50 on the right hand side of the house, the relative proportions of the windows has changed with the windows 44, 46 on the left hand side of the house in the second image 40 being larger than the windows 48, 50 on the right hand side of the house.

Since the appearance of an object can change significantly it is necessary to identify characteristics of an image which are not affected by the distortions resulting from a change of viewpoint. By characterizing points within an image which are not significantly affected by the distortions of the appearance of an image resulting from changes in camera position, it is possible to use the characterization of an image to establish which points within pairs of images correspond to the same physical points on an object.

Figure 3:
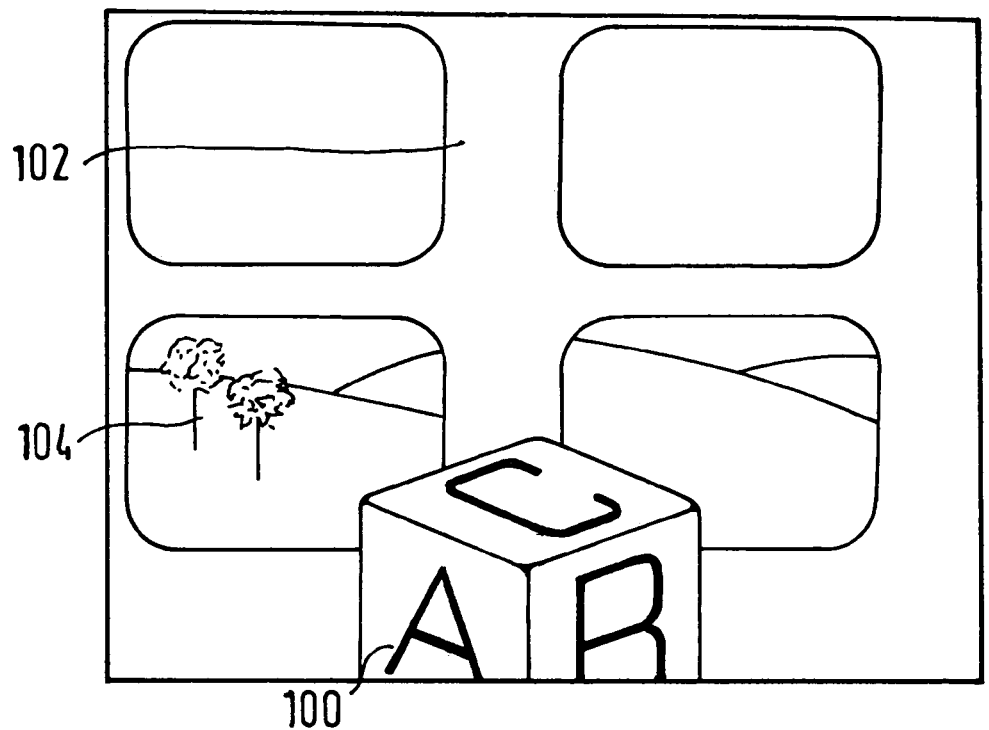
FIGS. 3 and 4 are a further pair of illustrative examples illustrating the effect of changing camera viewpoint.
Figure 4:
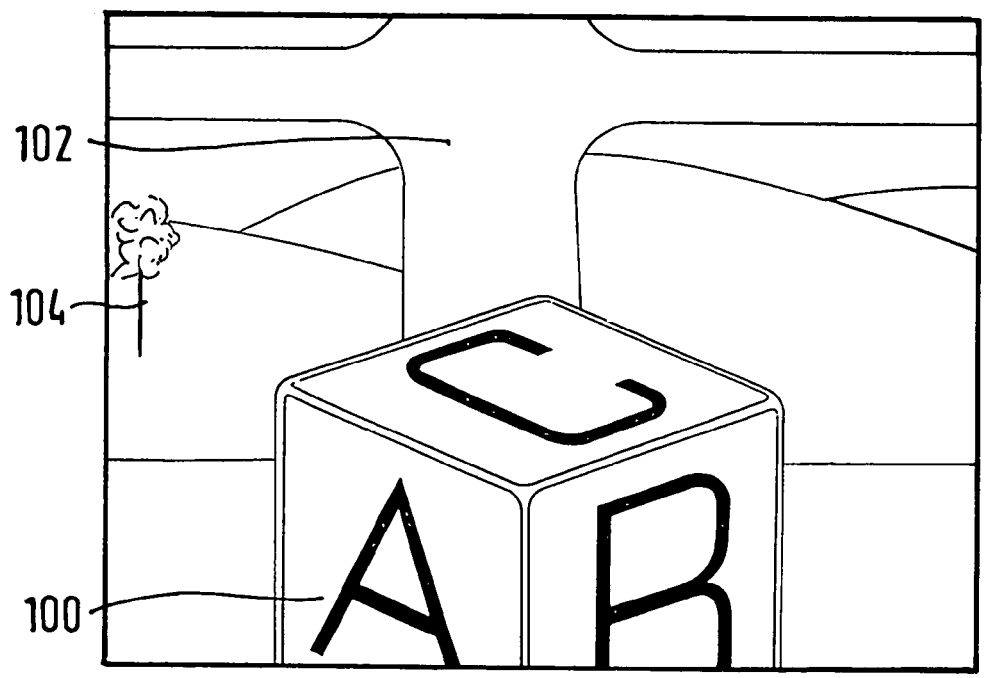

FIGS. 3 and 4 are two further exemplary images to illustrate a further problem with the matching of the points in images corresponding to the same physical points on an object. One of the problems of matching feature points in images of an object arises from the possibility that an object in one image may appear as a smaller or larger object in another image due to the fact that the two images have been taken from camera positions further or closer to an object.

FIG. 3 is an image showing a building block 100 in the foreground of a window 102 in the background with a landscape 104 visible through the window. The window panes of the window 102 form a cross at the center of the window where they meet.

FIG. 4 is an example of an image of the same scene taken from the camera viewpoint much closer to the building block 100. In the image of FIG. 4 the building block 100 appears to be much larger than it does in the image of FIG. 3.

The possibility that objects may appear to be of different sizes in different images due to a change of camera viewpoint gives rise to two separate problems when attempting to establish correspondence between points in one image and points in another image.

The first problem arising from changes of camera viewpoint that may cause a change of scale is that a change of scale may cause different points of interest to be selected for future characterization, thus making future matching impossible. This problem arises because some large scale features such as the cross at the center of the image of FIG. 3 may only become apparent when a large area of an image is considered. However, if only large areas of images are considered for the detection of points of interest, smaller feature points such as the corners of the building block 100 as it appears in FIG. 3 may be overlooked. However, where changes of scale are likely to occur it is necessary that both large and small features are detected since these may subsequently appear as small or large features in future images. Thus for example the small feature that appears as the corner of the building block 100 in the image of FIG. 3 appears as a far larger feature in the image of FIG. 4.

The second problem arising due to changes of scale arises after a selection of features of interest has been made. When feature points of interest have been selected, the features need to be characterized so that matching may occur. If features appearing as a large feature in one image are to be matched with the features which appear as a small feature in another image, it can be important to account for the fact that the features appear at different sizes as the characterization of a feature may vary due to the apparent size of the feature in an image. If no allowance is made for the possibility that the same feature may appear at different scales in different images when characterizing features the characterization of an image feature may be dependent on the size at which it appears and hence matching different sized representations of the same image may be impossible using such characterizations.

The present embodiment includes a feature matching and detection module 2 which provides a number of means by which differences in images arising from a change of camera viewpoint can be accounted for and hence enabling matching of features appearing in images taken from spaced view points to be facilitated as will now be described.

Feature Detection and Matching Module

Figure 5:
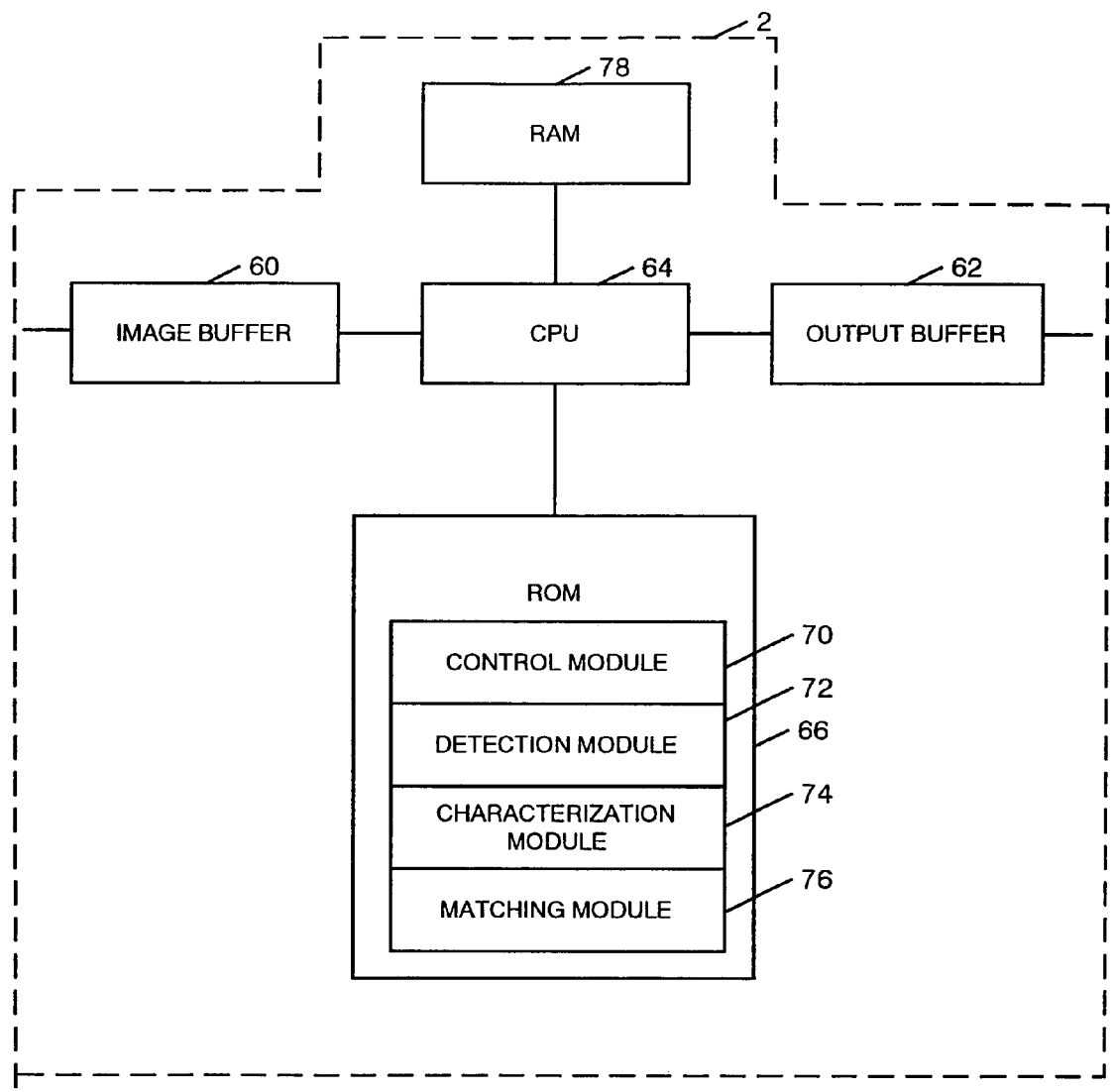
FIG. 5 is a block diagram of a feature detection and matching module in accordance with the first embodiment of the present invention.

FIG. 5 is a block diagram of a feature detection and matching module 2 in accordance with the first embodiment of the present invention. The feature detection and matching module 2 in this embodiment is arranged to receive grey scale image data recorded by a still camera from different positions relative to an object or video image data where an interruption in a video stream has occurred and filming has restarted from a different position and to output a list of pairs of co-ordinates of points in different images which correspond to the same physical point of the object appearing in the images. The list of pairs of co-ordinates can then be used by the camera position calculation module 6 to determine the orientation and position of the camera focal plane when each image was recorded. In this embodiment the feature matching and detection module 2 is arranged to perform processing in an iterative manner with the camera position calculation module 6 to match image feature points utilizing calculated camera positions and then refine calculated camera positions on the basis of those matched feature points.

The feature detection and matching module 2 comprises an image buffer 60 for receiving grey scale image data, comprising pixel data for images, and camera position data from the camera position calculation module. The image buffer 60 is connected to an output buffer 62 via a central processing unit (CPU) 64 which is arranged to process the image data stored in the image buffer 60 to generate a list of matched points output to the output buffer 62. The processing of image data by the CPU is in accordance with a set of programs stored within a read only memory (ROM) 66 which is connected to the CPU 64. In this embodiment the feature detection and matching module 2 is arranged to receive and process images of 768 by 576 pixels.

The programs stored in the ROM 66 comprise a control module 70 for coordinating the overall processing of the programs stored in the ROM 66, a detection module 72 for identifying features to be matched between images, a characterization module 74 for characterizing the features detected by the detection module 72 and a matching module 76 for matching features detected by the detection module 72 on the basis of the characterization of those features by the characterization module 74.

The CPU 64 is also connected to a random access memory (RAM) 78 which is used for the storage of variables calculated in the course of detecting features in images, characterizing those features and matching them to generate an output list of matched points between pairs of images.

Figure 6:
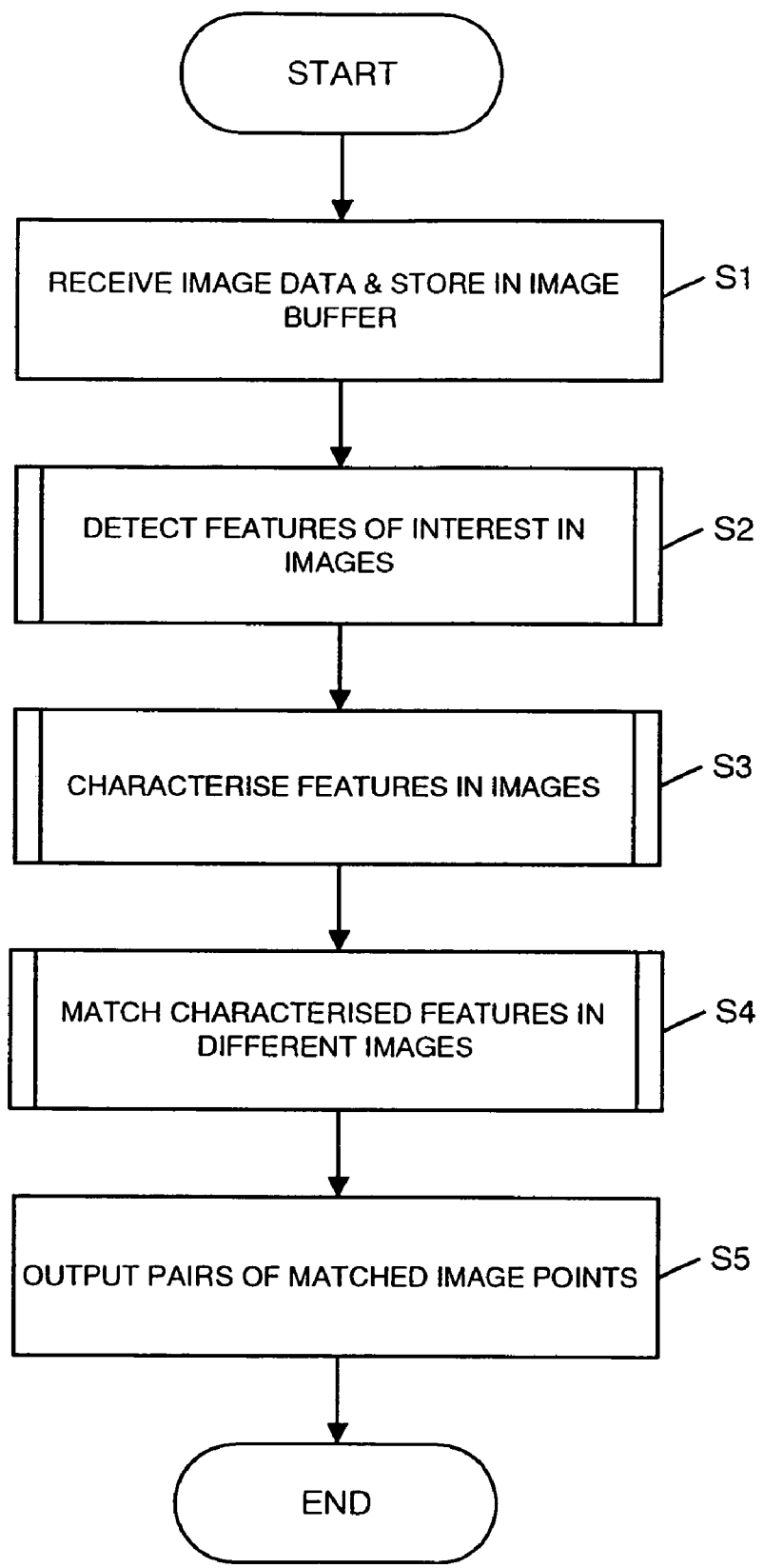
FIG. 6 is a flow diagram of the processing of the control module program of the feature detection and matching module of FIG. 5.

FIG. 6 is a flow diagram of the control module program 70 for coordinating the flow of control of the processing of data by the feature detection and matching module 2. Initially the control module 70 waits until image data is received (S1) and stored in the image buffer 60. This causes the control module 70 to invoke the detection module 72 to analyze the image data stored in the image buffer 60 to ascertain (S2) a number of feature points within the images stored in the image buffer 60 which are to be further processed to determine whether they can be matched as correspond to the same physical point on an object in two images stored within the image buffer 60 as will be described in detail later. The co-ordinates of the potential feature points of interest detected in the images stored in the image buffer 60 are then stored in RAM 78 together with other data relating to the feature points for use in the subsequent processing by the CPU 64 as will be described later.

When the feature points for a pair of images have been determined and stored in RAM 78 the control module 70 then invokes the characterizing module 74 to characterize (S3) each of the detected feature points using portions of the images around detected feature points as will be described in detail later. Data representative of the characterization of each of the feature points is then stored in RAM 78 so that it may be used to match points in different images as corresponding to the same physical point in an object appearing in the images.

When all of the feature points in a pair of images have been characterized by the characterization module 74 the control module 70 then invokes the matching module 76 to match (S4) the feature points characterized by the characterization module 74 in different images as corresponding to the same physical point on an object on the basis of the characterization data stored in RAM 78. After the matching module 76 has determined the best matches for feature points characterized by the characterization module 74 the control module 70 causes a list of pairs of matched feature points to be output (S5) to the output buffer 62.

Feature Detection

The detection module 72 is arranged to process image data stored in the image buffer 60 to select a number of feature points which are candidates for matching by the characterization module 74 and the matching module 76.

As part of the processing of image data to select feature points, the detection module 72 is arranged to generate smoothed image data by averaging values across a number of pixels to eliminate small features and to calculate feature strength values indicating the presence of features utilizing only limited areas of a smoothed image to eliminate large features. By linking these processes to a scaling factor and processing the image data for each of a predefined set of scaling factors, features of different sizes are detected and assigned feature strengths. In order that comparisons of feature strength can be made regardless of the scale factor which was used in the process to detect a feature, these feature strength values are calculated utilizing the selected scale factor to enable comparison of the strengths of features of different sizes as will now be described.

Figure 7A:
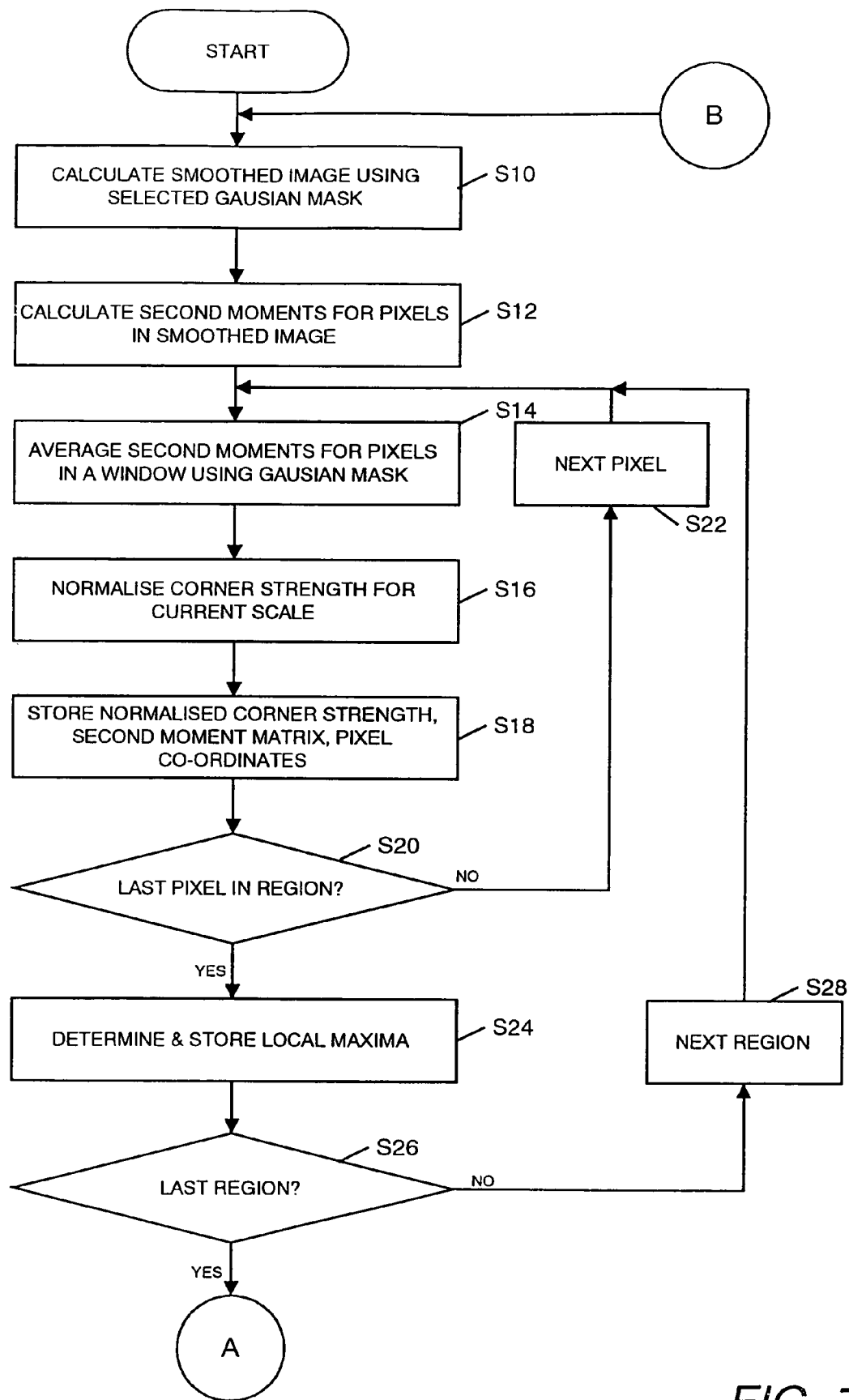
FIGS. 7A and 7B are a flow diagram of the processing of data in accordance with the detection module program of the feature detection and matching module of FIG. 5.
Figure 7B:
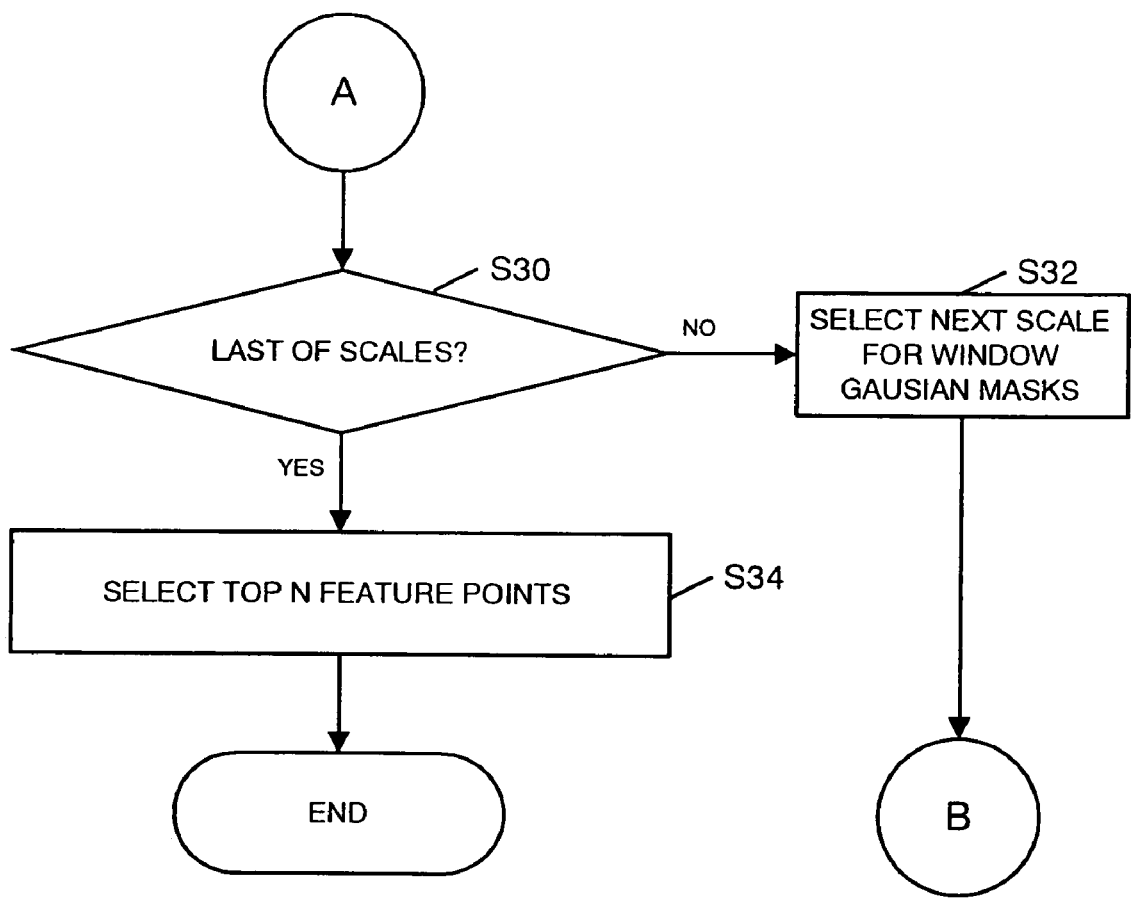

FIGS. 7A and 7B are a flow diagram of the processing of data in accordance with the detection module 72 stored in ROM 66. In this embodiment of the present invention the feature points of images stored within the image buffer 60 are selected on the basis of processing the image data to detect points within the images representative of corners on objects within the images.

Initially (S10) the detection module 72 causes the CPU 64 to calculate a smoothed set of image data based on the image data stored in the image buffer 60. In order to calculate a grey scale value for each pixel in the smoothed image, the sum of the grey scale pixel values of a region of the image centered on corresponding pixels in the image data is determined where the contribution of each pixel in that region of the image is scaled in accordance with a Gaussian function G(x,y) where:

$$G(x, y) = \exp - \frac{(x^2 + y^2)}{\sigma_s}$$

where x and y are the relative x & y coordinates of a pixel relative to the pixel for which a value in the smoothed image is to be calculated and $\sigma_s$ is the first of the set of scale factors stored in memory. In this embodiment the detection module 72 is arranged to detect features using a stored set of scale factors comprising the values of 0.5, 0.707, 1.414, 2, 2.828 and 4 with the first scale factor being 0.5. Each of the scale factors is associated with stored window size of square regions for calculating smoothed images and averaged second moment matrices at an associated scale as will now be described.

By calculating a smoothed image from the image data stored in the image buffer 60 a set of image data is obtained where the values for pixels in the smoothed image are dependent upon regions within the image. This has the effect of eliminating from the image data representing very small features which might otherwise be detected as a corner in the future processing of the image.

The scale at which an image is smoothed determines the extent to which the pixel value for a pixel in the smoothed image is determined by neighboring pixels. Where a small value is selected for $\sigma_s$, the effect of scaling is such that the contribution of other pixels reduces rapidly as the pixels get further away. Thus the value for a corresponding pixel in the smoothed image may be determined by only considering a small region of image data centered on a pixel with the contribution of pixels outside of that region being ignored. In contrast, for larger values $\sigma_s$ the contribution of more distant pixels in the image data is more significant. It is therefore no longer appropriate to ignore the contributions of these more distant pixels. A larger number of pixels in the image data must therefore be considered for the calculation of pixel values in a smoothed image at such larger scale.

Thus in this embodiment of the present invention when calculating a smoothed image at a scale associated with a small value of $\sigma_s$ a 3×3 region of pixels centred on a pixel in the original image is used to determine a value of the corresponding pixel in the smoothed image. For larger values of $\sigma_s$, progressively larger square regions are used with the size of the region being selected so that the scaling for those pixels whose contribution is not calculated is less than a threshold value for example $e^{-8}$. As stated previously each of these window sizes is stored in association with a scale factor and utilized automatically when the associated scale factor is utilized to generate a smoothed image.

When a smoothed image has been calculated and stored in memory 78 the detection module 72 then causes (S12) the CPU 64 to calculate for each pixel in the smoothed image a second moment matrix M where:

$$M = \begin{pmatrix} I_x^2 I_x I_y \\ I_x I_y I_y^2 \end{pmatrix}$$

where $I_x$ and $I_y$ are derivatives indicative of the rate of change of grey scale pixel values for pixels in the smoothed image along x and y coordinates respectively calculated in a conventional manner by determining the difference between grey scale values for adjacent pixels. The calculated values for the second moment matrices for each of the pixels in the smoothed image are then stored in the memory 78 for future processing.

The detection module 72 then causes (S14) an averaged second moment matrix for each of the pixels in a region to be calculated by the CPU 64. These averaged second moment matrices are calculated in a similar manner to the calculation of the smoothed image in that the averaged second memory matrix for a pixel is calculated from the sum of the second moment matrices for pixels in a square region centered on a selected pixel scaled by a scaling factor G(x, y) where:

$$G(x, y) = \exp\frac{-(x^2 + y^2)}{\sigma_t^2}$$

where x and y are the relative x & y coordinates of a pixel in a square region centered on the pixel for which an averaged second moment matrix image is to be calculated and $\sigma_t$ is a scale factor selected from a stored set of scale factors.

As has previously been stated in relation to the calculation of a smoothed image from received image data since the scale selected for an averaging operation determines the rate at which contributions from surrounding pixels declines, the selected scale also determines size of the region centered on a pixel which is relevant for determining the average as the scaled contribution of more distant pixels ceases to be of importance. Thus, as in the case of the calculation of the smoothed image, only a limited number of second moment matrices for pixels adjacent to a selected pixel need to be determined with those pixels whose contribution scaled by a factor of less than a threshold value, in this embodiment $e^{-8}$, being ignored.

In this embodiment of the present invention, the scale $\sigma_t$ at which second moment matrices in a region are determined is set to be equal to $2\sigma_s$. In this way the value determined for an averaged second moment matrix centered on a pixel is determined on the basis of the second moment matrices for pixels in a square region whose size is dependent on the value of $\sigma_s$ which is selected. Similarly, the size of a region is selected by utilizing a window size stored in association with a scale factor, which is twice the size of the window size used for generating a smoothed image with the same associated scale factor.

The combined effect of the smoothing operation to generate smoothed image and the subsequent averaging operation to calculate an averaged second moment matrix is to restrict the size of features which are detected by the detection module 72. Both operations, since they involve the determining of a calculated value for a pixel utilizing a region of an image act to eliminate the effect of small features whose effect is spread by the averaging process. However, since both processes only calculate values for pixels based on fixed regions of image data, features in the original image which are only apparent when larger regions of image data are considered will also be effectively filtered by the detection module 72. Thus, the averaged second moment matrices calculated for each pixel are representative of features in the original image, which have a size lying within a range defined by $\sigma_s$.

For each of the pixels for which an averaged second moment matrix has been calculated a normalized corner strength is then determined (S16) by the detection module 72. In this embodiment the normalized corner strength comprises a calculated value for a Harris corner detector scaled by $\sigma_s^{-4}$. The normalized corner strength for a pixel is calculated using the following equation:

$$NormalisedCornerStrength = \frac{1}{\sigma_s^4}[\det M_A - 0.04*(traceM_A)^2]$$

where $M_A$ is the averaged second moment matrix calculated for a pixel.

The calculated normalized corner strength for a pixel, the average second moment matrix and the co-ordinate of the pixel are then stored (S18) in memory 78. In this embodiment the normalized corner strength is used for selecting feature points for further characterization as will be described later. The averaged second moment matrix is used in the subsequent processing of selected feature points as will also be described later. By storing the value of the averaged second moment matrix the necessity of having to recalculate this matrix subsequently is avoided.

By calculating the normalized corner strength in the manner described above the calculated normalized corner strength is independent of the values selected for $\sigma_s$, since the difference in the values in $M_A$ arising from the determination of an averaged second moment matrix for a smoothed image across a region dependent upon a selected value for $\sigma_s$ are accounted for by making the normalized corner strength proportional to $\sigma_s^{-4}$.

Thus if two different sized regions in two images correspond to the same object taken from view points at different distances from the object the calculated normalized corner strengths for the same physical point on an object will be comparable. Therefore, by selecting a set of feature points for further characterization on the basis of the calculated normalized corner strengths, the same feature points can be selected regardless of the actual scale at which those features are detectable and hence the same features should be selected regardless of the apparent changes of size of an object due to changes of view point.

The calculated normalized corner strength for a pixel is indicative of a relative measure of the extent to which a region of an image centered on a point is indicative of a corner. Where a pixel is associated with a normalized corner strength is greater than its neighbors, this indicates that the pixel corresponds most closely to a point which has the appearance of a corner. In order to identify those points within an image which most strongly correspond to corners, the detection module 72 compares calculated normalized corner strengths for each pixel with the calculated normalized corner strengths for the neighboring pixels. In this embodiment this is achieved by the detection module 72 first determining (S20) whether normalized corner strengths have been stored for all the adjacent pixels in the region of the image for which the locations of normalized corner strength maxima are currently being determined. If the normalized corner strength has not yet been calculated for all adjacent pixels in this region of an image, the next pixel (S22) is selected and an average second moment matrix for that pixel and normalized corner strength is calculated and stored (S22, S14–S18).

When the detection module 72 determines (S20) that normalized corner strengths have been determined for all pixels in the current region for which the local corner strength maxima are to be calculated, the detection module 72 then determines (S24) which of the pixels correspond to local maxima of normalized corner strength. The co-ordinates of these local maxima are then stored in the memory 78 together with the associated normalized corner strength, the averaged second moment matrix calculated for that pixel, and the scale $\sigma_s$ at which the corner was detected.

When the local maxima for a region of an image have been determined, the detection module 72 then checks (S26) whether the region of the image for which corner strengths are currently being calculated corresponds to the last region of an image for which local corner strength maxima are determined. If the region of an image for which corner strengths are currently being determined is not the last region of an image for determining corner strength the detection module 72 then updates the areas of memory 78 storing data relating the normalized corner strengths for those pixels which are no longer necessary for determining the value for local maxima in the subsequent regions of the image to indicate that they may be reused and then calculates further normalized corner strengths (S28, S14–20) in the next region of the image and then determines and stores local maxima of corner strength for that region (S24).

The determination of local maxima region by region therefore enables data which is no longer necessary to determine local maxima to be overwritten and hence minimizes the memory required for the determination of which pixels correspond to local maxima and hence are most representative of corners in the original image.

If the detection module 72 determines (S26) that the pixels corresponding to local maxima of corner strength have been determined for all the pixels in the image the detection module 72 then (S30) determines whether the scale used for calculating smoothed images and average second moment matrices corresponds to the final scale where $\sigma_s$=4. If the scale does not correspond to the final scale the detection module 72 then selects (S32) the next largest scale for use to calculate a new smoothed image and a further set of local maxima of normalized corner strengths (S14–S30).

In this embodiment of the present invention the scales used for setting the values of $\sigma_s$ correspond to a set of scales where the value of $\sigma_s$ for each scale is geometrically greater than the previous scale at a ratio of $\sqrt{2}$, with $\sigma_s$ ranging between 0.5 and 4 i.e. $\sigma_s$=0.5, 0.707, 1, 1.414, 2, 2.828 and 4. The detection of features at a number of widely spaced scales ensures that as far as possible different feature points are detected at each scale. In this embodiment scales greater than 4 are not used as the processing required for generating smoothed images and average second moment matrices at such larger scales are relatively high and the smoothing at such large scales results in a loss of locality of feature points detected using such large scales.

When corner strengths and the co-ordinates of local maxima of corner strengths have been calculated at all of the selected scales, the detection module 72 then (S34) filters the data corresponding to the local maxima detected on the basis of the normalized corner strengths for those pixels to select a required number of points which have the highest corner strength and, hence, are most strongly indicative of corners within the images. In this embodiment, which is arranged to process image of 768 by 576 pixels, the top 400 points indicative of highest corner strengths determined at any of the seven scales with $\sigma_s$ ranging between 0.5 and 4.

When a desired number of feature points most strongly indicative of corners have determined by the detection module 72 the feature detection and characterizing module 2 will have stored in RAM 78 a set of coordinates for the feature points, each having an associated scale at which the feature point has been detected and the averaged second moment matrix for a region of the smoothed image centered on the feature point. In this embodiment, the control module 70 then invokes the characterization module 74 to generate a set of data characterizing the feature point in a way which is not significantly affected by viewing objects from different viewpoints as will now be described.

Feature Characterization

In order to characterize feature points in a way not significantly affected by distortions arising from viewing objects from different view points, the characterization module 74 in this embodiment characterizes each of feature points on the basis of processed image data for a region centered on that feature point, the size of which is selected utilizing information indicative of the size of a feature which has been used to select the feature point which is then converted into an image of a fixed size. This has the effect of making the characterization substantially independent of the distance at which an image of an object is recorded.

The resized image data is then processed to remove distortions arising from stretch and skew which result from viewing planar surfaces or surfaces which are approximately planar from different view points. The characterization module in this embodiment then generates a characterization vector utilizing the processed image data, comprising a set of values which are substantially independent of rotation of the processed image data which could arise either from rotations within the initial image data or from the processing to remove the effects of stretch and skew.

Figure 8:
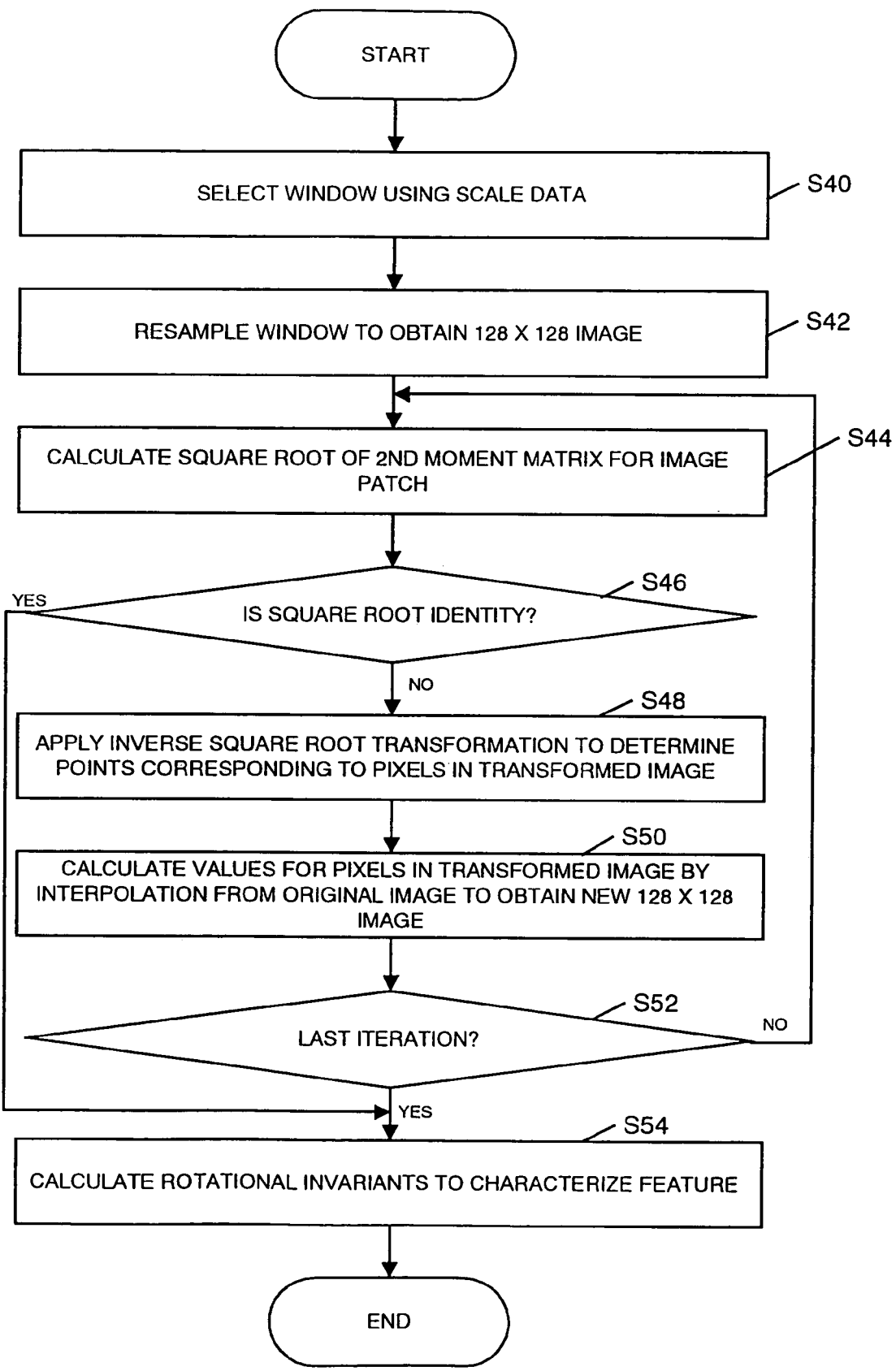
FIG. 8 is a flow diagram of the processing of the characterization module of the feature detection and matching module of FIG. 5.

FIG. 8 is a flow diagram of the processing of the characterization module 74 to characterize a feature point selected by the feature detection module 72. The processing of FIG. 8 is carried out for each of the feature points detected by the feature detection module 72 so that all of the feature points are characterized in a way substantially independent of distortions resulting from viewing objects from different view points.

As an initial step (S40) for characterizing a feature point, the characterization module 74 selects a portion of an image, centered on the feature point to be used as an image patch to characterize that feature point. In this embodiment of the present invention, the characterization module 74 determines the size of this image patch used to characterize a feature point on the basis of the scale at which a feature point was detected by the detection module 72. In the present embodiment, the characterization module 74 is arranged to utilize an image patch for the characterization of a feature point centered on the feature point that is twice the size of the region of an image used to detect the presence of a feature point. In this way a feature point is characterized by an image patch which necessarily includes the entirety of the feature detected by the feature detection module 72. By characterizing a feature point using an image patch centered on the feature point which is larger than the region of an image used to detect a feature, the inclusion of some additional image data is ensured which allows for the image to be transformed to account for stretch and skew as will be described in detail later.

After the characterization module 74 has selected the size of an image patch centered on a feature point, on the basis of the scale associated with the feature which has been detected, the characterization module 74 then re-samples (S42) this image patch of the image to obtain a new image patch of fixed size. In this embodiment the size of the new image patch is set at 128×128 pixels.

This resizing of the image patch is achieved by linear interpolation of values for pixels in the new image patch based upon the values of pixels in the original image patch. When a re-sampled image patch has been calculated this is stored in RAM 78.

The feature characterization module 74 then calculates a transformation required to transform the resized image patch into an image patch in which the effect of stretch and skew have been removed. The second moment matrix for an image patch comprises values which are indicative of the rate of change of grey scale values in the image patch along the x and y coordinates. The second moment matrix for an image patch is therefore indicative of how an image patch appears to be stretched and skewed, and can therefore be utilized to determine a transformation to remove the distortions resulting from stretch and skew which transform squares into parallelograms and circles into ellipses as will now be described.

Firstly, the characterization module 74 calculates (S44) a value for the square route of an averaged second moment matrix for the current image patch. In this embodiment, since a value for the averaged second moment matrix for a feature point is calculated and stored as part of the detection of feature points by the detection module 72 for an initial iteration, this stored value for the averaged second moment matrix for a feature point on which the image is centered is utilized as the value for a calculated second moment matrix for an image patch centered on that feature point. For subsequent iterations an average second moment matrix for an image patch is calculated in the same way as has been described in relation to the calculation of second moment matrices by the detection module 72.

When either a stored value for an averaged second moment matrix has been retrieved from memory, or a value for the average second moment matrix for an image patch has been calculated directly from the image data for an image patch the square root of this averaged second moment matrix is then determined by calculating a Cholesky decomposition of the average second moment matrix. The Cholesky decomposition is the decomposition of the averaged second moment matrix M so that:

$$\begin{pmatrix} a & 0 \\ b & c \end{pmatrix} \begin{pmatrix} a & b \\ 0 & c \end{pmatrix} = \begin{bmatrix} I_x^2 & I_{xy} \\ I_{xy} & I_y^2 \end{bmatrix}$$

where a=Ix, and b and c are values determined by the Cholesky decomposition of the averaged second moment matrix.

The characterization module 74 then determines (S46) if this calculated square root is equal to the identity matrix. If the square root of the second moment matrix for an image is equal to the identity matrix the image patch is already indicative of an image which has had the effect of stretch and skew removed and hence no further transformation is required. The characterization module then proceeds to characterize such an image by calculating a set of rotational invariants (S54) as will be described later.

If the square root of the second moment matrix is not equal to the identity matrix, the characterization module 74 instead proceeds to calculate a transformed image corresponding to the image patch transformed by the square root of the second moment matrix for the image patch scaled by a scaling factor λ where $$\lambda = 1/(DetM)^{1/2}$$

In this embodiment this transformed image patch is then generated (S48) by the characterization module 74 determining the co-ordinates of points corresponding to origin of pixels in a transformed image and then calculating (S50) pixel values on the basis of linear interpolation of a pixel value for these points utilising the distances and pixel values for the closest adjacent pixels in an original image, in a conventional manner.

Thus for example where by applying the inverse of the square root of the averaged second moment matrix scaled by $1/(\det M)^{1/2}$ to a point corresponding to pixel at position $x_1 y_1$, the origin for that point is determined to be $x_2 y_2$. A value for the pixel at $x_1 y_1$ in the transformed image is calculated by using the pixel values corresponding to the pixels which are closest to the point $x_2 y_2$ in the original image to interpolate a calculated value for that point. A transformed image is then built up by calculating pixel values for each of the other points corresponding to pixels in the transformed image by determining the origin for those pixels in an original image by applying the inverse square root scaled by $1/(\det M)^{1/2}$ and then calculating pixel values by interpolating a value for a pixel in the new image from the values for pixels adjacent to the origin for that pixel using linear interpolation.

The characterizing module 74 then determines (S52) whether a required number of iterations have been performed. In this embodiment the maximum number of iterations is set to be equal to two. If the required number of iterations is not equal to the maximum number of iterations which are to be performed the characterizing module 74 then proceeds to calculate the square root for the averaged second moment matrix for the transformed image patch and then generates a new transformed image utilizing this square root of the averaged second moment matrix for the image patch (S44–S52).

If the characterization module 74 has performed the maximum number of iterations required or it has been established that after calculating a second moment matrix for an image patch that second moment matrix is equal to identity, the transformed image patch will then correspond either exactly or approximately to an image patch from which the effects of stretch and skew have been removed. The characterization module then proceeds to calculate a set of rotational invariants (S54) to characterize the transformed image in a manner which is substantially independent of rotation of the transformed image as will be described in detail below.

As stated above the second moment matrix for an image patch is indicative of the rate of change of grayscale value across an image patch. Where one image patch corresponds to another image patch which has been stretched and skewed by an affine transformation if both of these image patches are transformed by the above described process so that the second moment matrix for both of the image patches is equal to identity the transformed image patches will correspond to each other subject to an arbitrary rotation provided the second moment matrix is calculated for what amounts to identical portions of an image. This correspondence arises as is explained in "Shape-adapted Smoothing in Estimation of 3-D Shape Cues from Affine Deformations of Local 2-D Brightness Structure", Image and Vision Computing, 15 (1997) pp 422–423 because of the relationship for a second moment matrix that:

$$M(BJ) = B^T M'(J) B$$

where B is a trans formation resulting in stretch and skew of an image patch, M(J) is an averaged second moment matrix for an image patch J, and M'(J) is the second moment matrix for an image patch J for a region of an image J which corresponds to the image patch BJ.

It then follows that if for two images J and J' which correspond to the same part of an image, M(J)=M(J')=I and J'=BJ then $I = M(J')$ $= M(BJ)$ $= B^T M'(J) B$ $= B^T I B$ $= B^T B$ which implies $B$ is a rotation and hence $J$ and $J'$ are the same image subject to an arbitrary rotation B, provided J and J' correspond to the same portions of an image (i.e. J'=BJ).

In the present embodiment, the characterization module 74 is arranged to transform an image patch by a number of transformations equal to the square root of an averaged second moment matrix scaled by a scaling factor equal to $1/\det(M)^{1/2}$. These transformations have the effect of transforming the original 128×128 image patches used to characterize a feature point to correspond to a distorted image patch in the original image. This amounts to an approximation which is equivalent to varying of the shape of the region used for selecting an image patch so that the image patches used to characterize feature points of an object appearing in images taken from different view points correspond to the same patches of the objects appearing in each of the images. Therefore if the second moment matrix patch for such transformed images is equal to the identity matrix, the above relationship that transformed images will correspond subject to an arbitrary rotation will hold. It has been found that good matching results occur when only one or two iterations transform an image patch and hence in this embodiment the total number of iterations is limited to two.

In this embodiment of the present invention after a transformed image patch for a feature point has been transformed to account for changes in scale, stretch and skew, this transformed image patch is then used to generate a characterization vector characterizing the feature point in a way substantially unaffected by distortions arising from changes of the appearance of an object by being viewed from different view points. This is achieved by generating a characterization vector utilizing calculated rotational invariants for the image patch as the combined result of processing a portion of an image to account for changes in scale, stretch skew and rotation is to characterize a point in a way substantially unaffected by distortions arising from changes of camera view point.

To achieve this the characterization module 74 in this embodiment is arranged to generate a characterization vector utilizing values determined using a set of masks to calculate a set of complex coefficients comprising approximate determinations of $$U_{n,m} = \int\int F_n(r) e^{im\phi} J(r,\phi) dr d\phi$$

where $J(r,\phi)$ is the transformed image centered on a feature point, $F_n(r)$ is set of a circular symmetric functions and $0 \leq n \leq n_{max}$, $0 \leq m \leq m_{max}$. Specifically, in this embodiment, the characterization module is arranged to calculate a set of nine complex coefficients comprising the values for $U_{n,m}$ for an image where $n_{max}$ and $m_{max}$ are equal to 2.

Under a rotation of an image:

$$J'(r,\phi) = J(r,\phi+\theta)$$

these complex coefficients undergo the following transformation:

$$U'_{n,m} = \int\int F_n(r) e^{im\phi} J'(r,\phi) dr d\phi = e^{im\theta} U_{n,m}$$

By calculating the above set of complex coefficients a set of values unaffected by rotation of the image may therefore be determined since $$\text{Re}(U_{n,0}) = \text{Re}(e^0 U_{n,0}) \quad \quad 1)$$
$$= \text{Re}(U_{n,0}) \text{ for } 0 \leq n \leq n_{max} \text{ for all } \theta.$$

where Re(z) is the real part of complex variable z;

$$|U_{0,m}| = |e^{im\theta} U_{0,m}| \quad \quad 2)$$
$$= |U'_{0,m}| \text{ for } 1 \leq m \leq m_{max} \text{ for all } \theta; \text{ and}$$

$$U_{n,m} U^*_{0,m} / |U_{0,m} U'_{0,m}| = e^{-im\theta} U^*_{0,m} / |U_{0,m}| \quad \quad 3)$$
$$= U'_{n,m} U^*_{0,m} / |U'_{0,m}| \text{ for } 1 \leq m < m_{max}$$
$$1 \leq n \leq n_{max}$$
$$\text{for all } \theta.$$

where U* is the complex conjugate of the complex variable U.

Therefore the following values can be determined utilizing these complex variables which are unaffected by rotation of an image $J(r,\phi)$.

1. $\text{Re}(U_{n,0})$ for $0 \leq n \leq n_{max}$
2. $|U_{0,m}|$ for $0 \leq m \leq m_{max}$
3. $\text{Re}(U_{n,m} U^*_{0,m}/|U_{0,m}|)$ for $1 \leq n \leq n_{max}$, $1 \leq m \leq m_{max}$
4. $\text{Im}(U_{n,m} U^*_{0,m}/|U_{0,m}|)$ for $1 \leq n \leq n_{max}$ $1 \leq m \leq m_{max}$ where
Re(z) is the real part of complex variable z
Im(z) is the imaginary part of complex variable z
and U* is the complex conjugate of the complex variable U.

The calculation of approximations of:

$$U_{n,m} = \int\int F_n(r) e^{im\phi} J(r,\phi) dr d\phi$$

where $J(r,\phi)$ is a transformed image centered on a feature point and $F_n(r)$ is a set of a circular symmetric function with $0 \leq n \leq 2$ and $0 \leq m \leq 2$ in this embodiment, is approximated by the sum of scaled pixel values for a transformed image patch with each of the combinations of pixels in the transformed image scaled by a scaling mask for each pair of n and m comprising a table of scaling factors. In this embodiment, a total of eighteen scaling masks are stored in memory and then used to calculate the approximations of the real and imaginary portions of $U_{n,m}$ with $0 \leq n \leq 2$ and $0 \leq m \leq 2$. Each of these masks comprise a stored 128×128 table of scaling factors where the scaling factors in each of the real masks correspond to calculated values for $$\sigma_{n,m}^R(x,y) = F_n(r) \cos \phi$$

where r and $\phi$ correspond to polar coordinates for a pixel at position x,y relative to the centre of an image patch and the scaling factors for each of the imaginary masks correspond to calculated values for $$\sigma_{x,y}{}^I(x,y) = -F_n(r)\sin m\phi$$

where r and $\phi$ correspond to polar coordinates for a pixel at a position x,y relative to the center of an image patch.

Thus in this way approximation of $U_{n,m}$ for each of the values of n,m $0 \leq n \leq 2$ and $0 \leq m \leq 2$ can then be determined for a 128×128 transformed image since $$U_{n,m} \cong \sum_{x=0}^{128} \sum_{y=0}^{128} [\sigma^R_{n,m}(x,y) + i\sigma^I_{n,m}(x,y)]p(x,y)$$

where p (x,y) is the grey scale value of a pixel in a transformed 128×128 image patch at position x,y.

Figure 9A:
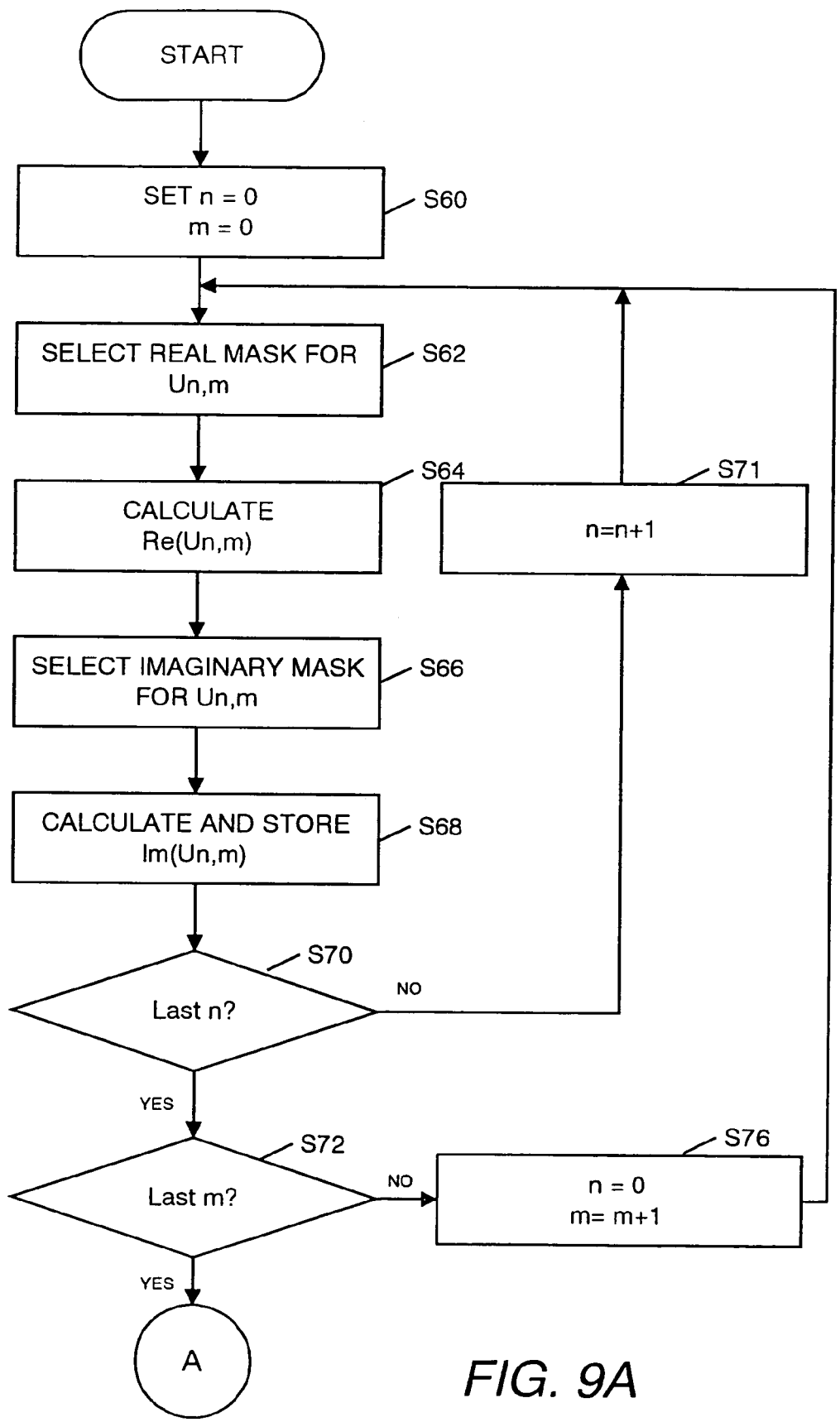
FIGS. 9A, 9B and 9C are a flow diagram of the calculation of rotational invariants by the characterization module.
Figure 9B:
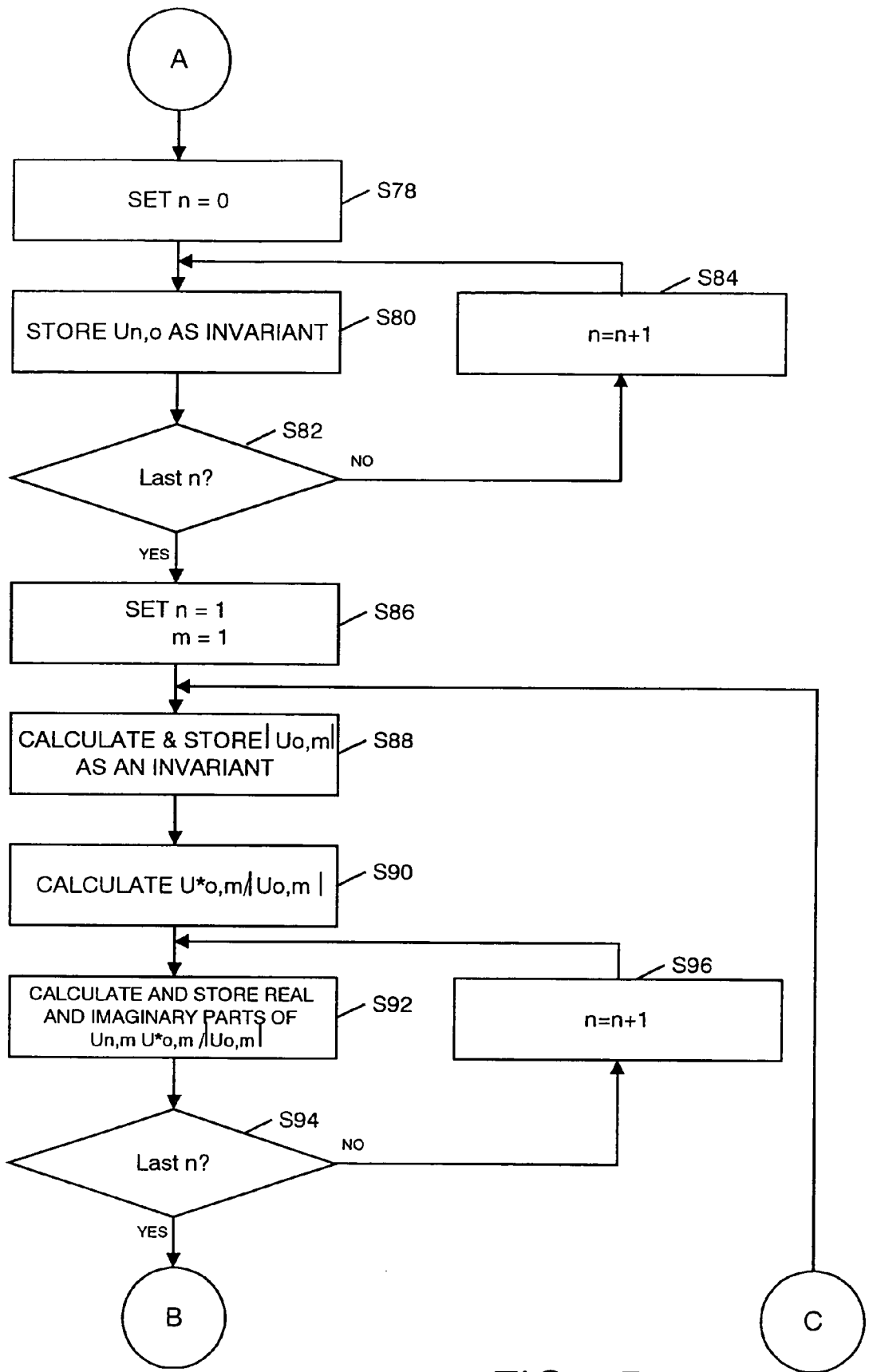
Figure 9C:
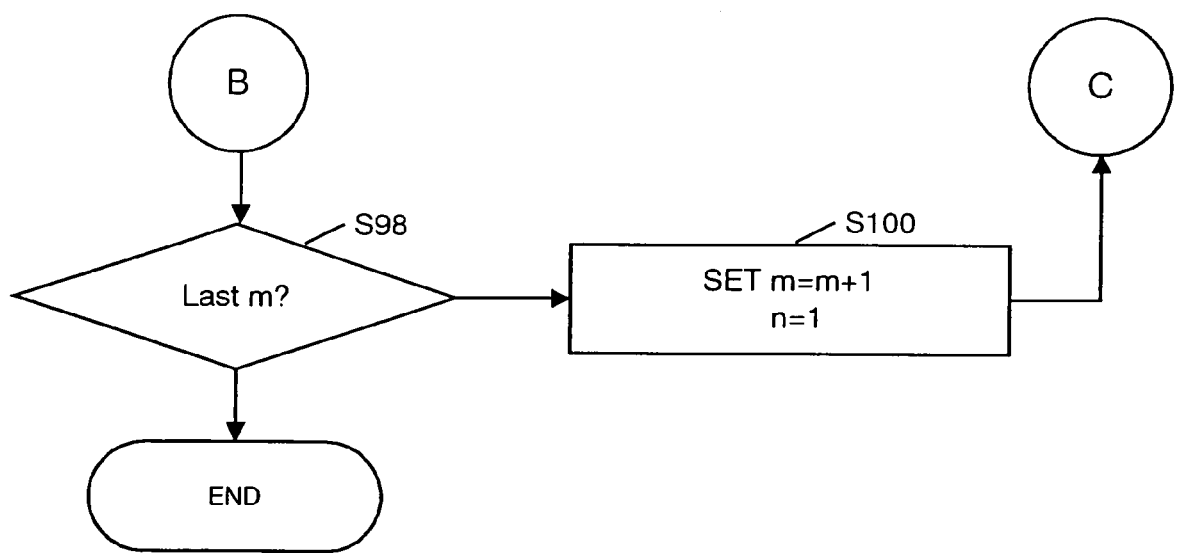

The processing of the generation of a characterization vector for a feature point by the characterization module 74 utilizing stored masks for calculating an approximation of $U_{n,m}$ with $$U_{n,m} = \int\int F_n(r)e^{im\phi}J(r,\phi)drd\phi$$

will now be described with reference to FIGS. 9A, 9B and 9C which comprise a flow diagram for the calculation of characterization vectors utilizing a stored set of scaling masks and corresponds to step S54 in FIG. 8 and also FIGS. 10–13 which are illustrations showing the distribution of scaling factors for scaling masks.

Initially (S60) n and m are set to zero. The characterization module 74 then selects (S62) from the stored set of 128×128 masks a real mask for calculating the real value for $U_{n,m}$.

In this embodiment $F_n(r)$ for the determination is selected to be a set of n derivatives of a Gausian function with a standard deviation or proportional to the 128×128 transformed image patch, with $0 \leq n \leq 2$. By utilizing a function which decreases the further array from the center of an image patch, calculated values for $U_{n,m}$ are most strongly dependent upon pixel values for the center of an image patch and hence the characterization of a feature point is primarily dependent upon the portion of an image closest to the feature point.

Figure 10:
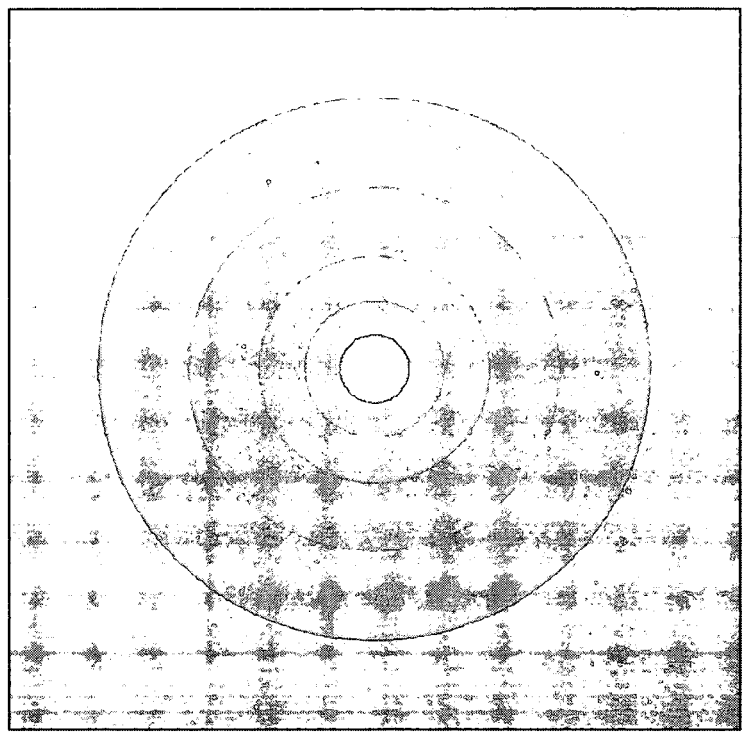
FIGS. 10, 11, 12A, 12B, 13A and 13B are illustrative examples of the distribution of scaling factors used in scaling masks to calculate approximations of complex coefficients for the calculation of rotation invariants.

FIG. 10 is an illustration of the distribution of scaling factors in an example of a mask for calculating Re($U_{00}$) where the scaling factor for points in the image is proportional to the color of grey in the figure. Thus for FIG. 10 which illustrates to a mask for calculating an approximation of the real value of:

$$U_{00} = \int\int G_\sigma(r)J(r,\phi)drd\phi$$

where $G_\sigma(r)$ is a Gausian function with a standard deviation $\sigma$ proportional to the size of a transformed image of 128 by 128 pixels.

In the case of $U_{00}$, since this is a completely real variable, the calculation of the real portion of the variable is the same as the calculation of the value for $U_{00}$ itself. The mask for calculating the value of this coefficient therefore comprises a table of scaling factors, where the factors are arranged in a series of concentric circles where the scaled contribution of the image decreases exponentially from one in the center of the image patch to zero towards the edge of the image patch in accordance with the distance of a pixel of the image patch from the center of the image patch. Thus as illustrated in FIG. 10 the small white circle at the center of the mask corresponds to a positive scaling factor of one and the mid-grey at the edge of the mask corresponds to a scaling factor of zero.

After the mask for $U_{00}$ has been selected a value for Re($U_{00}$) is calculated using the mask (S64) by summing the grey scale values of the transformed image patch, that is the image patch which has been transformed to remove the effect of stretch and skew where the contribution of each pixel is scaled by a factor in accordance with the selected mask. In the case of $U_{00}$, this has the effect of calculating a characterization value for the image patch in a similar way for the calculation of the values for pixels in the smoothed image, as the characterization value for an image patch is equal to the sum of the grey scale values for each of the pixels in the image patch where the contribution of each pixel is scaled by a scaling factor where the scaling factor decreases exponentially with the distance from the center of the image from one towards zero. The characterization module 74 then causes the calculated value to be stored in memory 78.

The characterization module 74 then selects (S66) an imaginary mask for calculating the imaginary portion of the complex variable under consideration. For complex variables other than $U_{n,0}$ a value for the imaginary portion of $U_{n,m}$ is calculated utilizing a selected mask and then stored (S68).

In the case of $U_{n,0}$ since $U_{n,0}$ is an entirely real complex variable, the mask Im($U_{n,0}$) would scale all of the values for the image patch by zero. Thus in the case of Im($U_{n,0}$) the step of selecting an imaginary mask and calculating an approximation of the imaginary portion of $U_{0,0}$ is omitted with the value zero merely being stored automatically.

The characterization module 74 then determines whether the current value of n is equal to the maximum value of m (in this embodiment 2), for which the complex variables $U_{n,m}$, is to be calculated.

If the characterization module 74 determines that the current value of n is less than the maximum value of n for which the complex variables $U_{n,m}$ are to be calculated the characterization module 74 then increments (S71) the value of n and then utilizes the new value of n to select (S62) a different mask for calculating the estimate of the real portion of another complex variable. The characterization module 74 then selects (S64) another mask for the calculation of the imaginary portion of $U_{n,m}$ (S66) which is calculated and stored (S68). When the imaginary portions of $U_{n,m}$ have been stored the characterization module 74 then again determines whether the current value of n is equal to the maximum value of n (S70).

When the characterization module 74 determines that the final value for n has been reached the characterization module then determines (S72) whether the current value of m is equal to the maximum value of m for which real and imaginary portions of $U_{n,m}$ are to be calculated. In this embodiment the characterization module 74 checks whether m is equal to 2 as this is the greatest value of m for which $U_{n,m}$ is calculated. If the value for m is not equal to the maximum value of m the characterization module 74 then increments the value of m and sets the value of n to zero to calculate a further set of complex variables for each value of n from zero to $n_{max}$ (S62–S74).

For each of the iterations for the calculation of values for $U_{n,m}$ a different set of real and imaginary masks each comprising 128 by 128 tables of scaling factors is used for determining a scaling of the contributions from each of the pixels in the image patch to determine the approximate value for $U_{n,m}$. FIGS. 11, 12A, 12B, 13A, 13B and 14A and 14B are illustrative examples of the arrangement of scaling factors within the 128×128 tables for scaling the contributions of pixels at a corresponding position within the 128×128 image patch to calculate the values for $U_{n,m}$ for different values of n and m.

Figure 11:
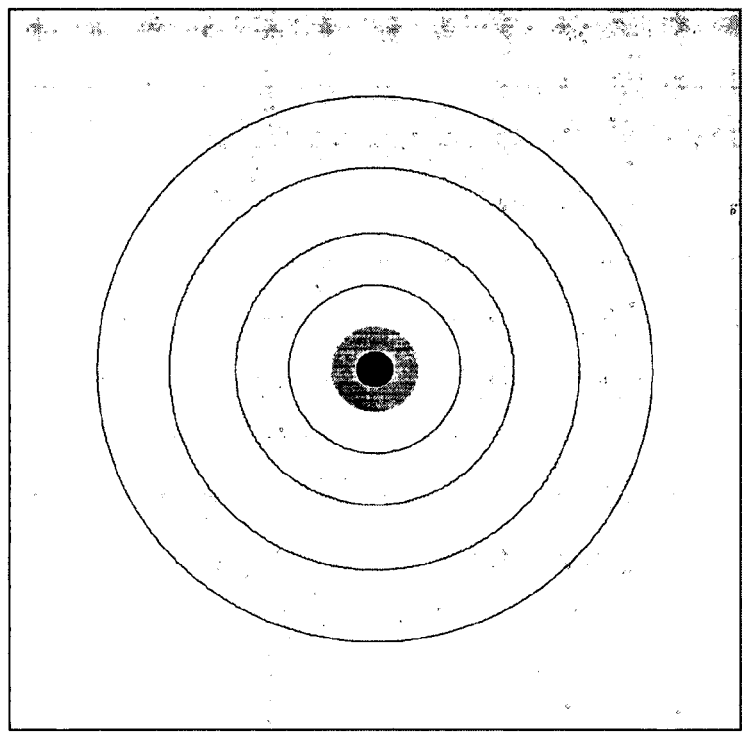

FIG. 11 is an illustrative example of the arrangement of scaling factors within a 128×128 table for the calculation of $U_{2,0}$. In the case of the calculation of $U_{2,0}$ $$U_{2,0} = \int\int \frac{d^2}{dr^2} G_\sigma(r) J(r, \varphi) dr d\varphi$$

where $G_\sigma(r)$ is a Gausian function with a standard deviation σ proportional to the size of the transformed image of 128 by 128 pixels.

As is the case for all of the complex variables $U_{n,o}$ this is an entirely real variable. The imaginary portion of $U_{n,0}$ is therefore equal to zero. The real portion of the $U_{2,0}$ can be determined by calculating the sum of the grey scale values for pixels in an image patch scaled by scaling factors where the scaling factors are arranged as shown in FIG. 11.

In the case of $U_{2,0}$ as is shown in FIG. 11, the variation in scaling factors is illustrated by varying shades of grey where white corresponds to a positive scaling factor of 1, black corresponds to the negative scaling factor of −1 and the mid grey at the edge of the figure corresponds to a value of zero. In the case of a mask for calculating the value of $Re(U_{2,0})$ the scaling factors vary between −1 and 1. The scaling mask is such that the central portion of an image patch being scaled by a factor of −1, with an annulus further away from the center of the image having a scaling factor of 1, with the scaling factor varying from −1 to 1 gradually as it moves away from the center towards this annulus. Beyond this annulus the scaling factor reduces from 1 to 0 further away from the center of the image patch.

Figure 12A:
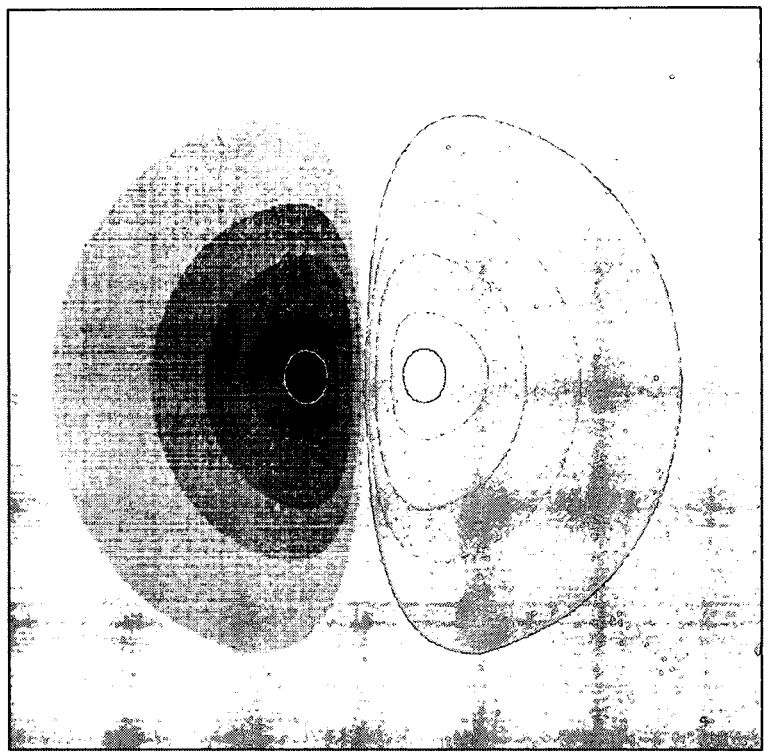
Figure 12B:
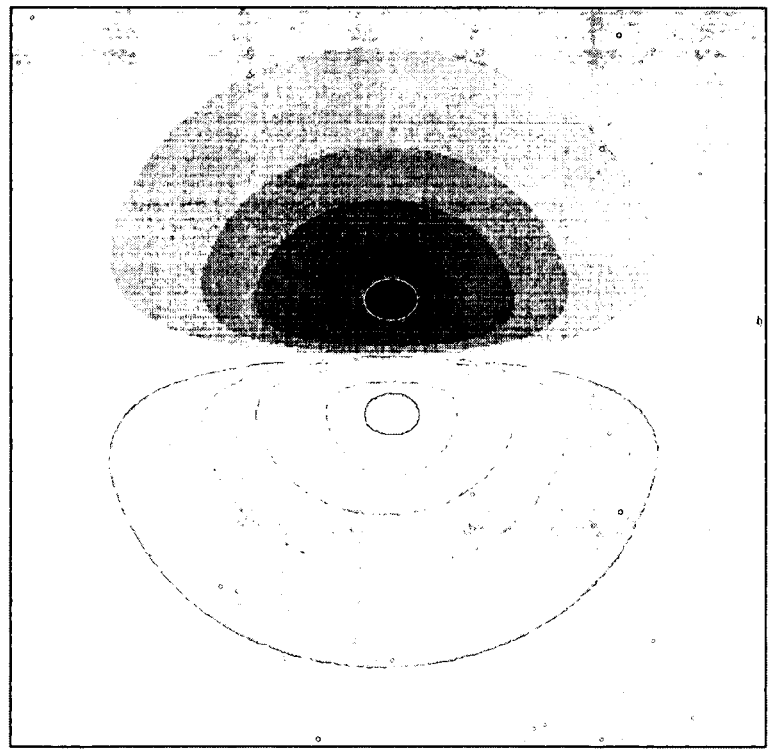

FIGS. 12A and 12B are exemplary illustrations of arrangements of scaling factors within tables for masks for calculating the real and imaginary portions of $U_{0,1}$ respectively. As in the case of FIGS. 10 and 11 these scaling factors are shown proportionateley as shade of grey in the Figure where black indicates a scaling factor of −1, white indicates a scaling factor of 1 and a mid grey at the edge of the figure indicates a scaling factor of zero with intermediate shades of grey being indicative of intermediate scaling factors.

In the case of the real portion of $U_{0,1}$ as is shown in FIG. 12A, the scaling mask comprises two regions, one on the left hand side of the image patch where the contributions of pixels on that side of the image patch are scaled by negative scaling factors and a symmetrical region in the right hand side of the image patch where the contributions of pixels in that region of the image patch are scaled by a positive scaling factors proportional to the corresponding negative scaling factors of pixels in the left hand portion of the image.

FIG. 12B is an illustration of arrangements of scaling factors within a table for a mask for calculating the imaginary portion of $U_{0,1}$. The mask of FIG. 12B is identical to the mask of FIG. 12A except that the mask is rotated about the center of the image patch by 90° so that a region of the image patch at the top of the patch is scaled by a variety of negative scaling factors and a symmetrical of region of the image patch at the lower portion of the image is scaled by positive scaling factors.

Figure 13A:
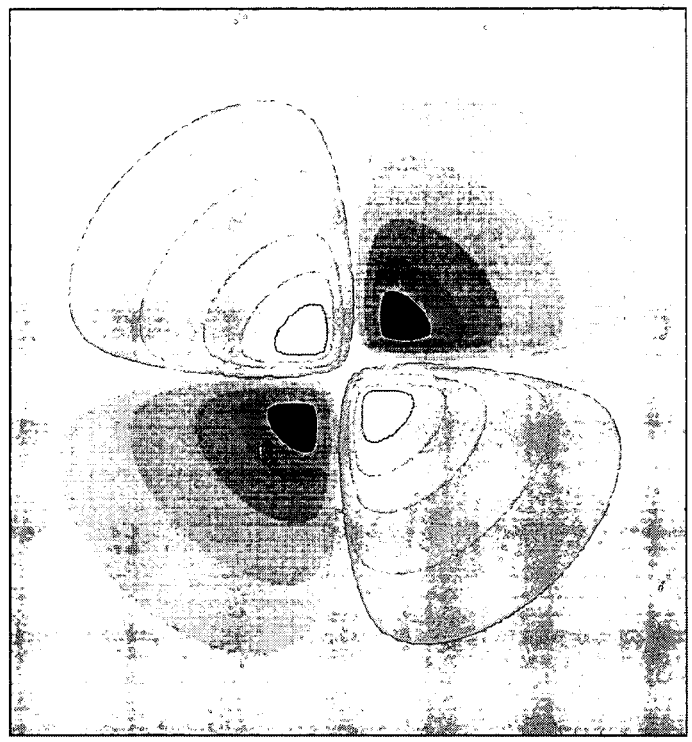
Figure 13B:
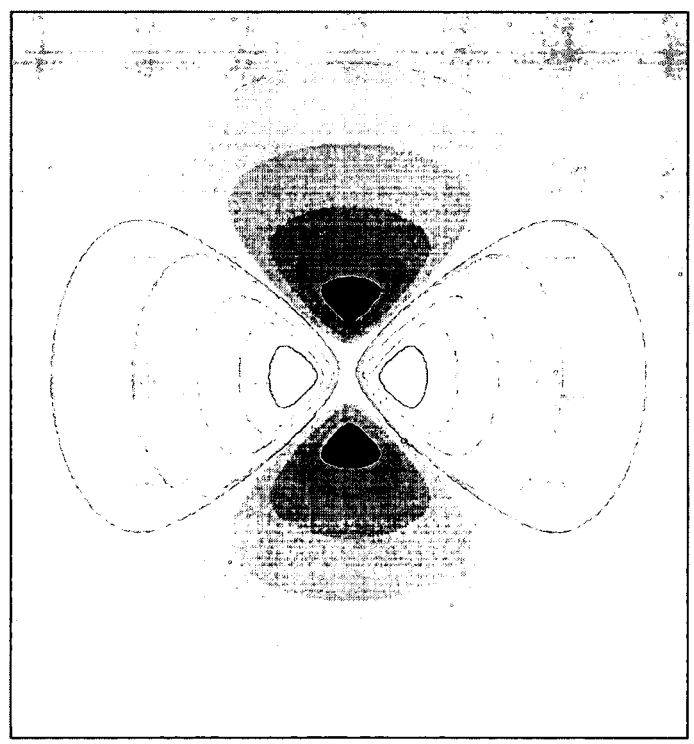

FIGS. 13A and 13B are illustrative examples of arrangements of scaling factors within tables for masks for calculating the real and imaginary portions of $U_{0,2}$. The masks indicate the scaling factors for different portions of an image in the same manner as FIGS. 10, 11, 12A and 12B with white indicating a positive scaling factor of 1, black indicating a negative scaling factor of 1 and intermediate shades of grey indicating intermediate scaling factors with the mid grey at the edge of the figure indicating a scaling factor of zero.

As can be seen from FIG. 13A the mask for the scaling of contributions of an image to determine the value for the real part of $U_{0,2}$ comprises a pair of regions aligned along an axis running from the top left hand corner of an image patch to the bottom right hand corner of the image patch which scale the contributions of pixels in an image patch by positive factors and a pair of regions along an axis from the top right hand corner of the figure to the bottom left hand corner of the figure composing two regions in which the patch are scaled by negative scaling factors.

The scaling mask of FIG. 13B for determining the imaginary portion of $U_{0,2}$ comprises a similar arrangement of similar regions to that of FIG. 13A in which the regions are arranged along axes rotated 45° anti clockwise relative to the orientations of the same regions in the mask for calculating the real portion of $U_{0,2}$ shown in FIG. 13A.

When the characterization module 74 has calculated all of the required values of $U_{n,m}$ data representative of these values will be stored in memory 78. The characterization module 74 then proceeds to utilize these values to generate sequentially a characterization vector characterizing the sampled image patch as will now be described.

In order to generate the characterization vector for a feature point the characterization module 74 initially sets the value of n to zero (S78). $U_{0,0}$ which is an entirely real variable is then stored (S80) in memory 78 as part of the characterization vector for the feature point for which the values of $U_{n,m}$ have been determined. The characterization module 74 then determines (S82) whether n is equal to $n_{max}$ i.e. in this embodiment whether n=2. If this is not the case the characterization module increments n (S84) and stores the value of $U_{n,0}$ for the new value of n as the next value in the sequentially generated characterization vector for the feature point (S80). In this way all of the values of $U_{n,0}$ for $0 \leq n \leq n_{max}$ are stored as part of the characterization vector for a feature point.

When the characterization module 74 determines (S82) that $n=n_{max}$, the characterization module then sets n and m equal to 1 (S86). The characterization module 74 then determines (S88) and stores in the memory 78 the value of the modulus of $U_{0,m}$ as the next value of the sequentially generated characterization vector for the feature point currently being processed, with the modulus of $U_{0,m}$ being determined from the value for the real and imaginary portions of $U_{0,m}$ stored in memory 78.

The characterization module 74 then determines (S90) a value for the complex conjugate of $U_{0,n}$ from the values for $U_{0,m}$ stored in memory 78 and determines from the values for the complex conjugate $U^*_{0,m}$ the value for $U^*_{0,m}/|U_{0,m}|$ where $U^*_{0,m}$ is the complex conjugate of $U_{0,m}$ and $|U_{0,m}|$ is the modulus of $U_{0,m}$.

The characterization module 74 then determines (S92) and stores the real and imaginary portions of the product of $U_{n,m}$ and $U^*_{0,m}/|U_{0,m}|$ with the real and imaginary portions of this product being stored as parts of the sequentially generated characterization vector for the feature point being processed.

The characterization module 74 then determines (S94) whether the current value for n is equal to $n_{max}$ (i.e. in this embodiment does n=2). If this is not the case the characterization module 74 then increments n (S96) and calculates a further set of values for the real and imaginary portions of the product of $U_{n,m}$ and $U^*_{0,m}/|U_{0,m}|$ utilizing this new value of n. In this way the product of $U_{n,m}$ and $U^*_{0,m}/|U_{0,m}|$ for all values of n are calculated and stored as part of the sequentially generated characterization vector for a feature point.

When the characterization module 74 establishes that $n=n_{max}$ the characterization module then (S98) tests to determine whether m is $m_{max}$. In this embodiment this means the characterization module 74 tests to determine whether m=2. If m is not equal to $m_{max}$ the characterization module 74 increments m (S100) and resets n to 1 and then proceeds to calculate and store as parts of the characterization vector for a feature point a modulus of $U_{0,m}$ utilizing the new m and the products of $U^*_{0,m}/|U_{0,m}|$ and $U_{n,m}$ with $1 \leq n \leq n_{max}$ (S88–S96). In this way the characterization module generates a characterization vector utilizing the values for $U_{n,m}$ in a way which generates values which are substantially independent of rotation of images in the transformed image patch.

Thus for example in the present embodiment where $m_{max}$ and $m_{max}$ are both equal to 2 the generated characterization vector comprises the following thirteen values:

$U_{0,0}$, $U_{1,0}$, $U_{2,0}$, $|U_{0,1}|$, $Re(U_{1,1}V_{0,1})$ $Im(U_{1,1}V_{0,1})$, $Re(V_{1,2}V_{0,1})$, $Im(U_2,V_{0,1})$ $|U_{0,2}|$, $Re(U_{1,2}V_{0,2})$ $Im(U_{1,2}V_{0,2})$, $Re(U_{2,2}V_{0,2})$, $Im(U_{2,2}V_{0,2})$ where
$V_{0,1} = U^*_{0,1}/|U_{0,1}|$ and
$V_{0,2} U^*_{0,2}/|U_{0,2}|$ all of which are substantially independent of rotation of a transformed image patch.

As the selection and processing of an image patch for the characterization of a feature point generates an image patch for a feature point which is substantially independent of distortions arising from changes in scale and distortions of stretch and skew arising from changes of view point, the combined result of selecting an image patch, processing the patch and characterizing a transformed image patch in a way which is substantially independent of rotation, is to generate a characterization vector for a feature point which is substantially independent of distortions arising from changes of camera view point.

Matching Module

When all the feature points of a pair of images have had characterization vectors generated for them in the manner described above the control module 70 then invokes the matching module 76 to determine which feature points in one image are most likely to correspond to the feature points in the second image, utilizing these characterization vectors. As the characterization vectors for feature points are substantially independent of distortions arising from changes of camera view point the matching of feature points between pairs of images should result in the matching of points corresponding to the same physical point on an object in a pair of images of that object taken from different view points.

Figure 14:
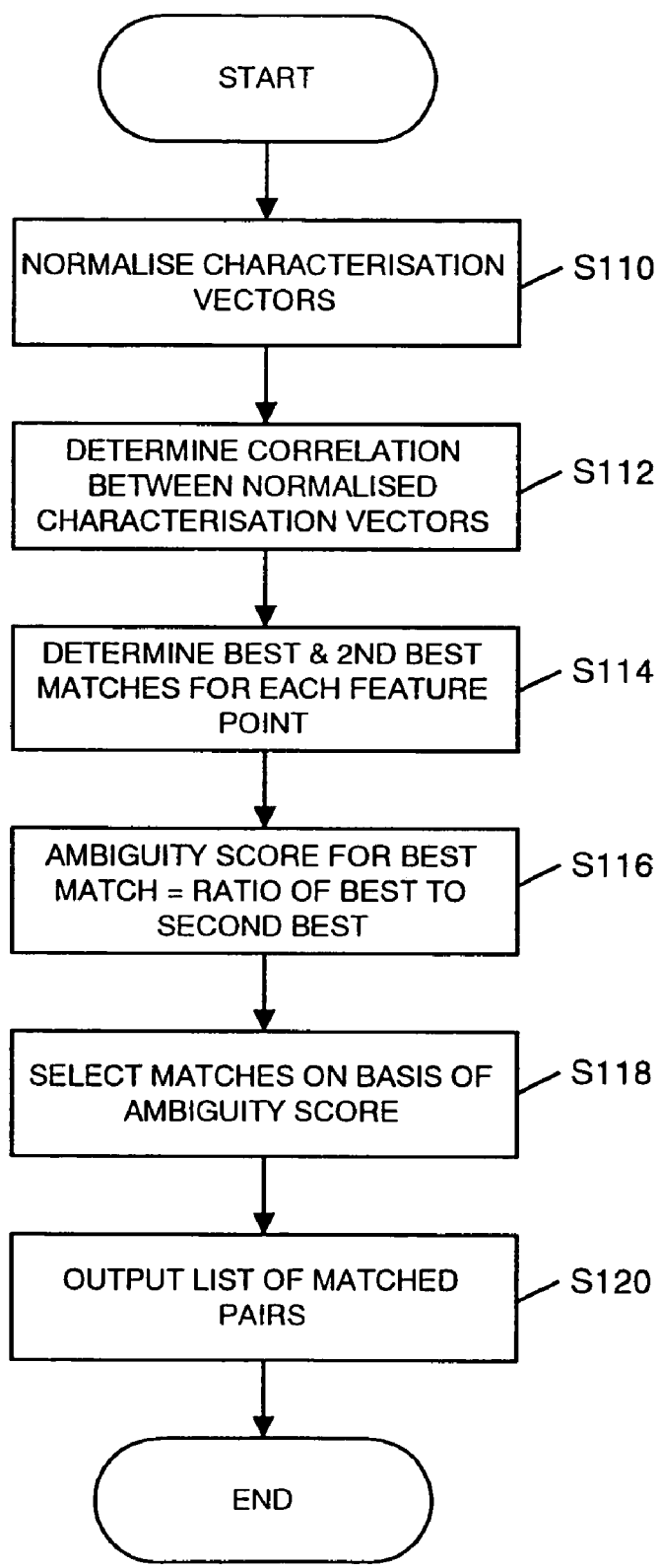
FIG. 14 is a flow diagram of the processing of the matching module of the feature detection and matching module of FIG. 5.

FIG. 14 is a flow diagram of the processing of the matching module 76. Initially (S110) in order to remove systematic correlations between the characterization vectors for the feature points, a covariance matrix for the characterization vectors is calculated in a conventional manner.

New characterization vectors are then calculated for the feature points in the images where the new characterization vectors for feature points are determined from the previously calculated characterization vectors which are multiplied by the square root of the covariance matrix for the characterization vectors. All of these new characterization vectors are then stored in memory 78. The calculation of the new set of characterization vectors has the effect of generating a set of normalized characterization vectors, normalized to remove systematic correlations between the values of the vector which arise because of systematic correlations within the original image data.

The matching module 76 then (S112) determines how closely normalized characterization vectors for points in one image correspond to characterization vectors for points in another image. The correspondence between vectors is determined by calculating the square of the Euclidean distances between each of the normalized characterization vectors for features points in one image to each of the normalized characterization vectors for points in the other image. These squares of Euclidean distances are indicative of the square of Mahalanobis distances between the characterization vectors originally calculated by the characterization module 74 for feature points in the images, since the Mahalanobis distance between two vectors $x_i x_j$ is defined by:

$$d(x^i, x^j) = sgrt((x^i - x^j))^T C^{-1} (x^i - x^j))$$

where C is the covariance matrix for the data.

The matching module 78 then determines (S114) for each of the normalized characterization vectors of feature points in the first image the normalized characterization vectors of the feature points in the second image which have the smallest and second smallest Euclidian distances from the characterization vector. These correspond to the feature points in the second image whose normalized characterization vectors most strongly correspond to the characterization vector of the point in the first image.

The matching module 76 then calculates (S116) an ambiguity score for the matching of a point in the first image with a point in the second image. In this embodiment the ambiguity score is the ratio of the square of Euclidean distance between the normalized characterization vector of a feature point in the first image and the normalized characterization vector of the point in the second image which most closely corresponds to the normalized characterization vector of the feature point in the first image relative to the square Euclidean distance between the normalized characterization vector for the feature point in the first image to the normalized characterization vector for the point in the second image which next most closely corresponds to the normalized characterization vector in the first image. This ambiguity score is then stored in memory 78 together with the co-ordinates of the point in the second image whose normalized characterization vector is closest to the normalized characterization vector of the feature point in the first image.

The ambiguity score calculated by determining a ratio between the most closely corresponding and second most closely corresponding normalized characterization vectors for points in the second image is indicative of the ambiguity of the best match for the point in the first image to a point in the second image. Where the ambiguity score is significantly less than one this indicates that the best candidate match for a point in the second image for matching to a point in the first image is characterized in a way in which it is clearly closer to the characterization of the feature point in the first image than any other point in the second image. Where the ambiguity score is close to one this indicates that there are alternative matches for a feature point in the first image whose characterization vectors are almost as good as a match as the feature point which most closely matches the characterization vector of the feature point in the first image.

By selecting the matches for pairs of images on the basis of selecting the least ambiguous matches the points which are matched are least likely to be incorrectly matched.

Thus for example in FIG. 2A portions of images about points in the first image 20 corresponding to windows 24, 26, 28, 30 are very similar and hence characterization vectors generated for these points would also be very similar. After a transformation resulting from a change of view point these features are all transformed in similar ways to appear as the windows 44, 46, 48, 50 in the second image 40 in FIG. 2B, and hence the calculated characterization vectors for these points in the second image 40 will also be similar. The likelihood of accidentally matching a point corresponding to a window in the first image 20 to the wrong window in the image of the second image 40 is therefore quite high. However, the characterization for unique points in the images 20, 40 of FIGS. 2A & B such as the door 32, 52, chimney 34, 54 or flower 36, 56 can be more safely matched even if the actual correspondence between the characterization of those points between the images is not as high as it is for the correspondence for the characterization of the points corresponding to windows. This is because there is greater certainty that the matches of such unique points are more likely to be correct. The fact that the correspondence between the matching of a characterization vector in one image to its best match in another image is not high is less important than the match between points being unambiguous as it is sufficient to establish a small number of correct matches initially and then utilize these initial matches to establish further matches by using iterative camera positions calculated by the camera position calculation module 6 on the basis of the initial matches to constrain further point matching. However, if the initial matches are incorrect the processing necessary to correct this error is substantial. Thus, where a large number of equally likely candidates for a matching exist it is preferable to ignore that potential match, regardless of how strong it might be.

Thus, in this embodiment, when ambiguity scores have been determined for the potential matches for each of the points in the first image the matching module 76 then selects (S118) from the list of matches the matches which have the lowest ambiguity scores. Selecting the matches having the lowest ambiguity scores ensures that matches which are selected are most likely to correspond to unique portions of images and hence are most likely to correspond to the same point on an object in images of an object taken from different view points. The matching module 76 then outputs (S120) a list comprising pairs of coordinates for the points in the first image having the lowest ambiguity scores and the corresponding points in the second image whose characterization vectors most closely correspond to those points. This list of coordinates being those points in the images which correspond to the same physical points on an object appearing in those images. This list of matched feature points is then output to the output buffer 62 and is then made available for example by being sent to the camera position calculation module 6 in the form of an electrical signal or by being output on a disc for further processing by the camera position calculation module 6 to determine the relative positions from which images have been obtained and then subsequently to enable a 3D model of an object in an image to be generated.

SECOND EMBODIMENT

In the previously described embodiment, the feature detection and matching module was described which was arranged to match data representative of grey scale images. In this embodiment the feature detection and matching module 2 is arranged to detect and match features in color images. The feature detection and matching module 2 in this embodiment of the invention are identical to that of the previous embodiment but the processing of the detection module 72, characterization module 74 and matching module 76 are modified as will now be described.

In the case of modification of the feature detection module 72, it is arranged to determine from the color image data corresponding to a pair of images a grey scale image in which the values for pixels are representative of the luminance of pixels appearing in the color image. This can be achieved either by generating a grey scale image from a single monochrome image or from three color images in the manner disclosed in annex A or in any other conventional manner. The detection of points corresponding to corners in an image then proceeds utilizing this grey scale image in the manner previously described. Thus in this way the points within the color image corresponding to corners is determined.

In regards to modification of characterization module 74, it is arranged to select and transform image patches of the color image associated with feature points in the same way as is described in relation to the first embodiment to establish transformed color images associated with feature points which are transformed to account for the effect of stretch and skew.

However, in contrast to this previous embodiment, the characterization module 74 is then arranged to determine a set of complex coefficients utilizing scaling masks as has previously been described to obtain scaled sums of each of the individual red, green and blue components of the pixels for the transformed image patches. This is achieved in the same manner as has been described in relation to the calculation of complex coefficients for a grey scale image with each of the red, green and blue channels being treated as a separate grey scale image. The characterization module 74 then calculates the following values for an image patch which are independent of the rotation of image data for that image patch:

$$\mathrm{Re}(U^R_{n,0}) \quad 0 \leq n \leq n_{max}$$

$$\mathrm{Re}(U^G_{n,0}) \quad 0 \leq n \leq n_{max}$$

$$\mathrm{Re}(U^B_{n,0}) \quad 0 \leq n \leq n_{max}$$

$$|V^1_m| \quad 1 \leq m \leq m_{max}$$

$$V^2_m(V^1_m)^*/|V^1_m| \quad 1 \leq m \leq m_{max}$$

$$V^3_m(V^1_m)^*/|V^1_m| \quad 1 \leq m \leq m_{max}$$

$$U^R_{n,m}V^1_m(V^1_m)^*/|V^1_m| \quad 1 \leq n \leq n_{max}, 1 \leq m \leq m_{max}$$

$$U^G_{n,m}V^1_m(V^1_m)^*/|V^1_m| \quad 1 \leq n \leq n_{max}, 1 \leq m \leq m_{max}$$

$$U^B_{n,m}V^1_m(V^1_m)^*/|V^1_m| \quad 1 \leq n \leq n_{max}, 1 \leq m \leq m_{max}$$

where $$U_{n,m}{}^C = \iint F_n(r)e^{im\phi}J^C(r,\phi)drd\phi$$

F(r) is a set of n a circular symmetric functions;

$J^C(r,\phi)$ an image patch of the colour component of an image centred on a feature point with C=R, G or B;

$V_m{}^1$ is whichever of $U^R{}_{0,m}$ or $U^G{}_{0,m}$ or $U^B{}_{0,m}$ which has the greatest modulus;

$V^2{}_m$ is whichever of $U^R{}_{0,m}$, a $U^G{}_{0,m}$, $U^B{}_{0,m}$ has the next greatest modulus; and $V^3{}_m$ is whichever of $U^R{}_{0,m}$, $U^G{}_{0,m}$, $U^B{}_{0,m}$ is of the smallest modulus.

In this way a greater number of independent invariants may be calculated than can be calculated for a grey scale image by accounting for the variation of all three of the color channels. Utilizing the value for $U^R{}_{0,m}$, $U^G{}_{0,m}$, $U^B{}_{0,m}$ which has the greatest modulus to account for the variations in the complex variables arising due to rotations ensures that errors due to approximations are minimized. These errors arise because the values for the complex coefficients are calculated by approximation of integrations by calculations of scaled sums. Since only the argument of some complex variables are used to account for variations arising due to rotation, the most reliable complex variable to use will have the largest modulus, as the argument for this complex coefficient will be least affected by small variations in the values of the calculated values for its real and imaginary parts arising due to approximations.

When all of these values for the characterization of an image patch have been determined the matching module 76 then utilizes characterization vectors including all of these values for matching one point in an image to its best match in a second image. Thus in this way the additional data available in a colour image can be used to increase the data which can be used to match points in different images.

THIRD EMBODIMENT

Although in the previous embodiments the present invention has been described in the context of a feature detection and characterization module 2 for a system for generating three-dimensional computer models from images taken from different viewpoints, the present invention may also be used in a number of other ways. In this embodiment of the present invention the detection and characterization of feature points is used to generate characterization data which is stored together with images in a database. The matching of the characterization of detected feature points of input images is then compared with the stored database of characterization data to identify which of the images in the database corresponds to an input image.

FIG. 15 is a block diagram of an image indexing apparatus in accordance with this embodiment of the present invention. The image indexing apparatus of this embodiment is identical to the feature detection and characterization module 2 previously described except that additionally a database 300 of images is also provided connected to the CPU 64 of the feature detection and characterization module 2. The control module 70 and matching module 76 are also modified to enable input images to be compared with index images stored in the database 300 and will now be described.

When an image is received by the image buffer 60 the control module 70 causes feature points to be detected and characterized in the manner as has previously been described in relation to either of the previous embodiments. When a set of feature points in the image has been characterized the control module 70 then invokes the matching module 76 to match the characterization generated for an image in the image buffer 60 with stored characterizations for index images stored in the database 300. The matching module 76 then determines which of the stored images best matches the input image by selecting the image having the greatest number of unambiguous matches.

Thus in this way the matching module 76 determines which of the images having characterization values stored in the database 300 most closely corresponds to the image received in the image buffer by determining the best matches between characterized feature points for an image in the image buffer and each of the images in the database and then on the basis of those matches determining which of the images in the database 300 most closely corresponds to the image in the image buffer 60. The CPU 64 then retrieves a copy of the image in the database 300 and outputs the retrieved image for comparison with the input image. Thus by characterizing the image received by the image buffer 60 in the way previously described a similar image stored in the databases 300 may be retrieved and output from a database.

FOURTH EMBODIMENT

In the processing of the previous embodiment an input image was characterized and the characterization of the image was then compared to a database of images each of which had previously been characterized to retrieve from the database an image which most closely resembles the input image. In this embodiment of the present invention an indexing apparatus is provided which is arranged to identify whether an input image is a copy of an earlier image utilizing the detection and characterization of feature points in an image has previously been described.

In accordance with this embodiment of the present invention a copy identification apparatus is provided which is identical to the apparatus of FIG. 15 except in this embodiment the database 300 has stored therein only previous characterizations of images from which copies may have been made. The control module 70 is then arranged on receipt of an image in the image buffer 60 to detect a number of feature points and characterize those feature points in a manner which has previously been described and then to compare the characterization of feature points of the input image with characterizations stored in the database 300.

Where the characterization of an image input into the image buffer 60 is identical to the characterization of an image stored in the database 300, this is indicative of the fact that the same feature points characterized in the same way appear in the input image and the reference image previously characterized whose reference values have been stored in the database 300. The matching of characterization values generated for an input image with stored values for an original image therefore identifies whether an image input into the image buffer 60 is a copy of an earlier image whose characterization is stored in the database 300. In particular, by deliberately introducing certain features into an image which will result in the output of certain predefined characterization values following the analysis of the image by a feature detection and characterization module, a means is provided which enables the identification of the origin of subsequent copies of those images.

FIFTH EMBODIMENT

In the previous embodiment the present invention has been described in terms of apparatus for identifying and characterizing feature points matching those feature points with similarly characterized feature points either in other images or against a database of previously characterized images. In this embodiment of the present invention apparatus is provided which is arranged to remove the effects of stretch and skew from an image and to output an image transformed to account for the effect of stretch and skew.

FIG. 16 is a block diagram of apparatus in accordance with the fifth embodiment of the present invention. The apparatus in accordance with this embodiment of the present invention is identical to the feature detection and matching module 2 of the first embodiment except that stored in memory 66 is a skew removal program 310 and the output buffer 62 is arranged to output an image transformed to remove the effect of stretch and skew.

In accordance with this embodiment of the present invention when an image is received by the image buffer 60 the skew removal program 310 proceeds in the same way as has previously been described in relation to the first embodiment to determine for the image an average second moment matrix for the image. The skew removal program 310 then utilizes the determined second moment matrix to generate a transformed image transformed by the calculated square root for the second moment matrix of the image as has previously been described. The skew removal program 310 proceeds in the same manner as has been described in relation to the characterization module 74 in the first embodiment, to determine whether a required number of transformations for example two transformations have been performed or if the second moment matrix for a transformed image is equal to identity and continues to generate further transformed images in an iterative manner until either the second moment matrix for a transformed image is equal to identity or the required number of transformations has taken place. When either the calculated second moment matrix for a transformed image is determined equal to identity or a required number of transformations have taken place the transformed image stored in memory 78 is then output to the output buffer 62.

In this way by transforming an image in the image buffer 60 by a number of iterations utilizing the square root of a calculated second moment matrix for the image an output image is generated which corresponds to the original image transformed to a skew normalized frame. In this way a number of images taken from different view points which introduce a skew into an image can be transformed to images where this skew is removed so that the different images with the skew removed may be compared.

Further Amendments and Modifications

In the previous embodiments the detection module 72 has been described which is arranged to identify feature points in images corresponding to corners on objects in the images. However, the detection module 72 could be arranged to detect alternative features. Thus for example instead of calculating normalized corner strengths (where a value representative of a strength of a corner is determined and scaled in accordance with the size of the portion of an image used to detect a corner strength), other values representative of some features in an image with these values being scaled to account for the variation in such values arising due to the size of the region. Suitable features which might be detected could include points indicative of high curvature such as can be determined by calculating a value scaled for the size of a region used to determine a value for:

$$\nabla^2 I$$

where I is the intensity of an image.

Although a feature detection module 72 has been described which is arranged to detect features at a series of scales $\sigma_s$ where the scales comprise a geometric progression of increasing scale other selections of scales could be used.

The use of larger numbers of scales may enable features to be more accurately matched since this will increase the chances that the same physical point in an object appearing in two different images will be characterized utilizing the same portion of an object to generate characterization values. However, increasing the number of scales also increases the amount of computation required to select suitable feature points. In general, it is therefore preferable to select the number of scales at which feature points are detected on the basis of the size of the image in which feature points are to be detected.

Thus for example for a video image of 760 by 576 pixels the detection of features utilizing windows between 3 by 3 to 14 by 14 pixels has been found to identify most feature points of interest. The detection of feature points using larger windows larger than 14 by 14 for this size of image has not been found to improve the ability of a feature detection and matching module 2 to match features more accurately. This is due to the increased computational complexity required for calculating smoothed values over such a large region and the fact that the determination of a feature point utilizing such a large region is not sufficiently specific to enable a detected feature point to be accurately matched with other points in other images.

In the detection module 72 described above the selection of feature points for subsequent processing is described in terms of selecting a desired number of feature points. However, the normalized feature strength determined by the detection module 72 could itself be used to filter a list of potential feature points with only those feature points having a normalized feature strength greater than a set threshold being utilized in subsequent processing. The advantage of utilizing a threshold to select those features which are selected for future processing is that this ensures only those features having particularly strong feature detection values are subsequently processed.

In the previous embodiments the characterization module 74 has been described arranged to characterize a feature point utilizing a square region of pixels centered on the detected feature point. However, the characterization module 74 could be arranged to characterize a feature point using any suitably shaped region of an image such as a rectangular region or an oval or circular region of an image.

The characterization module 74 could also be arranged to characterize a feature point in other ways in addition to the characterization utilizing values which substantially independent of transformation resulting in linear distortions of regions of an image.

For example, characterizing values which are substantially invariant under rotation of an image could be used. The calculation of rotational invariants could either be determined utilizing the method described in detail in the above embodiments or alternatively the calculation of rotation of variants as described in Gouet et al 'A Fast Matching Method for Colour Uncalibrated Images Using Differential Convariants' British Vision Conference, 1998, Vol. 1, pages 367 to 376 could be used in the place of the method described above either to calculate rotational invariants or to calculate rotational invariants utilizing portions of an image which have been transformed to account for distortions arising due to stretch and skew.

In the case of such rotational invariants a suitably shaped image patch to characterize a point utilizing rotational invariants would be a circular image patch. By making the shape of a selected image patch dependent upon the manner in which an image patch is to be characterized, a means is provided to ensure that a feature point is characterized in to generate characterization values invariant for distortions for which characterization values are calculated. The size of this image patch could then be arranged to be selected on the basis of a scale associated with a detected feature point.

Although in the above described embodiments one way of associating a scale with a feature point has been described where the strength of the feature point is reduced proportionately to account for the different sizes of regions utilized to detect the feature point, other ways associating a detected feature point for this scale could be used. Thus for example where features are detected at a number of different scales a 'scale space' maximum could be determined in a manner suggested by Lindeberg in 'Scale Space Theory in Computers', Kluwer Academic, Dordrecht, Netherlands, 1994. This suggests that by detecting the strength of feature points across a range of scales, a scale which associates a point most strongly with a calculated feature strength can be determined. The scale associated with such "scale space maxima" could then be used to determine the size of a region used to further characterize a detected feature point.

In the previous embodiments a matching module 76 has been described which is arranged to calculate ambiguity scores utilizing calculated ratios of squares of Euclidian distances between normalized characterization vectors. However, other ambiguity scores indicative of the similarity of potential matches for a feature point could be used. Thus for example a ratio of dot products of normalized characterization vectors could be used as a value indicative of the ambiguity of a candidate match for a feature point, and matches for feature points could then be selected on the basis of the size of such a ratio.

Although a matching module 76 has been described which is arranged to select matches for feature points utilizing a calculated ambiguity score as the sole criterion for selecting matches for feature points, other methods of selecting characterized feature points could be used. For example, solely the correlation between characterizations of feature points could be used although this is not a preferred method as this may give rise to incorrect matching when portions of an image are self similar.

In the embodiments above the processing performed is described in terms of a CPU using processing defined by programming instructions. However, some or all, of the processing could be performed using hardware.

The present application incorporates by cross-reference the full contents of the following applications of the assignee which are being filed simultaneously herewith:

Attorney reference CFP1793US (2636550) which claims priority from UK applications 9927876.4, 9927875.6, 0019081.9 and 0019122.1.

Attorney reference CFP1797US (2641050) which claims priority from UK applications 9929957.0 and 0019123.9.

Attorney reference CFP1800US (2635850) which claims priority from UK applications 0001300.3, 0001479.5, 0018492.9, 0019120.5, 0019082.7 and 0019089.2.

ANNEX A

1. Corner Detection

1.1 Summary

This process described below calculates corner points, to sub-pixel accuracy, from a single grey scale or color image. It does this by first detecting edge boundaries in the image and then choosing corner points to be points where a strong edge changes direction rapidly. The method is based on the facet model of corner detection, described in Haralick and Shapiro[i].

1.2 Algorithm

The algorithm has four stages:
(1) Create grey scale image (if necessary);
(2) Calculate edge strengths and directions;
(3) Calculate edge boundaries;
(4) Calculate corner points.

1.2.1 Create Grey Scale Image

The corner detection method works on grey scale images. For color images, the color values are first converted to floating point grey scale values using the formula:

$$\text{grey\_scale} = (0.3 \times \text{red}) + (0.59 \times \text{green}) + (0.11 \times \text{blue}) \quad \text{A-1}$$

This is the standard definition of brightness as defined by NTSC and described in Foley and van Dam[ii].

1.2.2 Calculate Edge Strengths and Directions

The edge strengths and directions are calculated using the 7×7 integrated directional derivative gradient operator discussed in section 8.9 of Haralick and Shapiro[i].

The row and column forms of the derivative operator are both applied to each pixel in the grey scale image. The results are combined in the standard way to calculate the edge strength and edge direction at each pixel.

The output of this part of the algorithm is a complete derivative image.

1.2.3 Calculate Edge Boundaries

The edge boundaries are calculated by using a zero crossing edge detection method based on a set of 5×5 kernels describing a bivariate cubic fit to the neighborhood of each pixel.

The edge boundary detection method places an edge at all pixels which are close to a negatively sloped zero crossing of the second directional derivative taken in the direction of the gradient, where the derivatives are defined using the bivariate cubic fit to the grey level surface. The sub-pixel location of the zero crossing is also stored along with the pixel location.

The method of edge boundary detection is described in more detail in section 8.8.4 of Haralick and Shapiro[i].

1.2.4 Calculate Corner Points

The corner points are calculated using a method which uses the edge boundaries calculated in the previous step.

Corners are associated with two conditions:
(1) the occurrence of an edge boundary; and
(2) significant changes in edge direction.

Each of the pixels on the edge boundary is tested for "cornerness" by considering two points equidistant to it along the tangent direction. If the change in the edge direction is greater than a given threshold then the point is labeled as a corner. This step is described in section 8.10.1 of Haralick and Shapiro[i].

Finally the corners are sorted on the product of the edge strength magnitude and the change of edge direction. The top 200 corners which are separated by at least 5 pixels are output.

2. Feature Tracking

2.1 Summary

This process described below tracks feature points (typically-corners) across a sequence of grey scale or color images.

The tracking method uses a constant image velocity Kalman filter to predict the motion of the corners, and a correlation based matcher to make the measurements of corner correspondences.

The method assumes that the motion of corners is smooth enough across the sequence of input images that a constant velocity Kalman filter is useful, and that corner measurements and motion can be modeled by gaussians.

2.2 Algorithm

1) Input corners from an image.
2) Predict forward using Kalman filter.
3) If the position uncertainty of the predicted corner is greater than a threshold, $\Delta$, as measured by the state positional variance, drop the corner from the list of currently tracked corners.
4) input a new image from the sequence.
5) For each of the currently tracked corners:
   a) search a window in the new image for pixels which match the corner;
   b) update the corresponding Kalman filter, using any new observations (i.e. matches).
6) Input the corners from the new image as new points to be tracked (first, filtering them to remove any which are too close to existing tracked points).
7) Go back to (2)

2.2.1 Prediction

This uses the following standard Kalman filter equations for prediction, assuming a constant velocity and random uniform gaussian acceleration model for the dynamics:

$$X_{n+1} = \theta_{n+1,n} X^n \qquad \text{A-2}$$

$$K_{n+1} = \theta_{n+1,n} K_n \theta_{n+1,n}^T + Q_n \qquad \text{A-3}$$

where x is the 4D state of the system, (defined by the position and velocity vector of the corner), K is the state covariance matrix, $\theta$ is the transition matrix, and Q is the process covariance matrix.

In this model, the transition matrix and process covariance matrix are constant and have the following values:

$$\theta_{n+1,n} = \begin{pmatrix} I & I \\ 0 & I \end{pmatrix} \qquad \text{A-4}$$

$$Q_n = \begin{pmatrix} 0 & 0 \\ 0 & \sigma_v^2 I \end{pmatrix} \qquad \text{A-5}$$

2.2.2 Searching and Matching

This uses the positional uncertainty (given by the top two diagonal elements of the state covariance matrix, K) to define a region in which to search for new measurements (i.e. a range gate).

The range gate is a rectangular region of dimensions:

$$\Delta x = \sqrt{K_{11}}, \Delta y = \sqrt{K_{22}} \qquad \text{A-6}$$

The correlation score between a window around the previously measured corner and each of the pixels in the range gate is calculated.

The two top correlation scores are kept.

If the top correlation score is larger than a threshold, $C_0$, and the difference between the two top correlation scores is larger than a threshold $\Delta C$, then the pixel with the top correlation score is kept as the latest measurement.

2.2.3 Update.

The measurement is used to update the Kalman filter in the standard way:

$$G = KH^T(HKH^T + R)^{-1} \qquad \text{A-7}$$

$$x \rightarrow x + G(\hat{x} - Hx) \qquad \text{A-8}$$

$$K \rightarrow (I - GH)K \qquad \text{A-9}$$

where G is the Kalman gain, H is the measurement matrix, and R is the measurement covariance matrix.

In this implementation, the measurement matrix and measurement covariance matrix are both constant, being given by:

$$H(I\ 0) \qquad \text{A-10}$$

$$R = \sigma^2 I \qquad \text{A-11}$$

2.2.4 Parameters

The parameters of the algorithm are:
Initial conditions: $x_0$ and $K_0$.
Process velocity variance: $\sigma_v^2$.
Measurement variance: $\sigma^2$.
Position uncertainty threshold for loss of track: $\Delta$.
Covariance threshold: $C_0$.
Matching ambiguity threshold: $\Delta C$.

For the initial conditions, the position of the first corner measurement and zero velocity are used, with an initial covariance matrix of the form:

$$K_0 = \begin{pmatrix} 0 & 0 \\ 0 & \sigma_0^2 I \end{pmatrix} \qquad \text{A-12}$$

$\sigma_0^2$ is set to $\sigma_0^2 200 (\text{pixels/frame})^2$.

The algorithm's behavior over a long sequence is anyway not too dependent on the initial conditions.

The process velocity variance is set to the fixed value of 50 (pixels/frame)$^2$. The process velocity variance would have to be increased above this for a hand-held sequence. In fact it is straightforward to obtain a reasonable value for the process velocity variance adaptively.

The measurement variance is obtained from the following model:

$$\sigma^2 = (rK + \alpha) \qquad \text{A-13}$$

where $K = \sqrt{(K_{11} K_{22})}$ is a measure of the positional uncertainty, r is a parameter related to the likelihood of obtaining an outlier, and a is a parameter related to the measurement uncertainty of inliers "r" and "a" are set to r=0.1 and a=1.0.

This model takes into account, in a heuristic way, the fact that it is more likely that an outlier will be obtained if the range gate is large.

The measurement variance (in fact the full measurement covariance matrix R) could also be obtained from the behavior of the auto-correlation in the neighborhood of the measurement. However this would not take into account the likelihood of obtaining an outlier.

The remaining parameters are set to the values: $\Delta$=400 pixels$^2$, $C_0$=0.9 and $\Delta C$=0.001.

3. 3D Surface Generation 3.1 Architecture

In the method described below, it is assumed that the object can be segmented from the background in a set of images completely surrounding the object. Although this restricts the generality of the method, this constraint can often be arranged in practice, particularly for small objects.

The method consists of five processes, which are run consecutively:

First, for all the images in which the camera positions and orientations have been calculated, the object is segmented from the background, using color information. This produces a set of binary images, where the pixels are marked as being either object or background.

The segments are used, together with the camera positions and orientations, to generate a voxel carving, consisting of a 3D grid of voxels enclosing the object. Each of the voxels is marked as being either object or empty space.

The voxel carving is turned into a 3D surface triangulation, using a standard triangulation algorithm (marching cubes).

The number of triangles is reduced substantially by passing the triangulation through a decimation process.

Finally the triangulation is textured, using appropriate parts of the original images to provide the texturing on the triangles.

3.2 Segmentation

The aim of this process is to segment an object (in front of a reasonably homogeneous coloured background) in an image using colour information. The resulting binary image is used in voxel carving.

Two alternative methods are used:

Method 1: input a single RGB colour value representing the background colour—each RGB pixel in the image is examined and if the Euclidean distance to the background colour (in RGB space) is less than a specified threshold the pixel is labelled as background (BLACK).

Method 2: input a "blue" image containing a representative region of the background.

The algorithm has two stages:
(1) Build a hash table of quantised background colours.
(2) Use the table to segment each image.

Step 1) Build Hash Table

Go through each RGB pixel, p, in the "blue" background image.

Set q to be a quantized version of p. Explicitly:

$$q=(p+t/2)/t \quad \text{A-14}$$

where t is a threshold determining how near RGB values need to be to background colors to be labeled as background.

The quantization step has two effects:
1) reducing the number of RGB pixel values, thus increasing the efficiency of hashing;
2) defining the threshold for how close a RGB pixel has to be to a background color pixel to be labeled as background.

q is now added to a hash table (if not already in the table) using the (integer) hashing function $$h(q)=(q\_red \ \& \ 7)*2^6+(q\_green \ \& \ 7)*2^3+(q\_blue \ \& \ 7) \quad \text{A-15}$$

That is, the 3 least significant bits of each color field are used. This function is chosen to try and spread out the data into the available bins. Ideally each bin in the hash table has a small number of color entries. Each quantized color RGB triple is only added once to the table (the frequency of a value is irrelevant).

Step 2) Segment Each Image

Go through each RGB pixel, v, in each image.

Set w to be the quantized version of v as before.

To decide whether w is in the hash table, explicitly look at all the entries in the bin with index h(w) and see if any of them are the same as w. If yes, then v is a background pixel—set the corresponding pixel in the output image to BLACK. If no then v is a foreground pixel—set the corresponding pixel in the output image to WHITE.

Post Processing: For both methods a post process is performed to fill small holes and remove small isolated regions.

A median filter is used with a circular window. (A circular window is chosen to avoid biasing the result in the x or y directions).

Build a circular mask of radius r. Explicitly store the start and end values for each scan line on the circle.

Go through each pixel in the binary image.

Place the center of the mask on the current pixel. Count the number of BLACK pixels and the number of WHITE pixels in the circular region.

If (#WHITE pixels≦#BLACK pixels) then set corresponding output pixel to WHITE. Otherwise output pixel is BLACK.

3.3 Voxel Carving

The aim of this process is to produce a 3D voxel grid, enclosing the object, with each of the voxels marked as either object or empty space.

The input to the algorithm is:
- a set of binary segmentation images, each of which is associated with a camera position and orientation;
- 2 sets of 3D co-ordinates, (xmin, ymin, zmin) and (xmax, ymax, zmax), describing the opposite vertices of a cube surrounding the object;
- a parameter, n, giving the number of voxels required in the voxel grid.

A pre-processing step calculates a suitable size for the voxels (they are cubes) and the 3D locations of the voxels, using n, (xmin, ymin, zmin) and (xmax, ymax, zmax).

Then, for each of the voxels in the grid, the mid-point of the voxel cube is projected into each of the segmentation images. If the projected point falls onto a pixel which is marked as background, on any of the images, then the corresponding voxel is marked as empty space, otherwise it is marked as belonging to the object.

Voxel carving is described further in "Rapid Octree Construction from Image Sequences" by R. Szeliski in CVGIP: Image Understanding, Volume 58, Number 1, July 1993, pages 23–32.

3.4 Marching Cubes

The aim of the process is to produce a surface triangulation from a set of samples of an implicit function representing the surface (for instance a signed distance function). In the case where the implicit function has been obtained from a voxel carve, the implicit function takes the value −1 for samples which are inside the object and +1 for samples which are outside the object.

Marching cubes is an algorithm that takes a set of samples of an implicit surface (e.g. a signed distance function) sampled at regular intervals on a voxel grid, and extracts a triangulated surface mesh. Lorensen and Cline[iii] and Bloomenthal[iv] give details on the algorithm and its implementation.

The marching-cubes algorithm constructs a surface mesh by "marching" around the cubes while following the zero crossings of the implicit surface f(x)=0, adding to the triangulation as it goes. The signed distance allows the marching-cubes algorithm to interpolate the location of the surface with higher accuracy than the resolution of the volume grid. The marching cubes algorithm can be used as a continuation method (i.e. it finds an initial surface point and extends the surface from this point).

3.5 Decimation

The aim of the process is to reduce the number of triangles in the model, making the model more compact and therefore easier to load and render in real time.

The process reads in a triangular mesh and then randomly removes each vertex to see if the vertex contributes to the shape of the surface or not. (i.e. if the hole is filled, is the vertex a "long" way from the filled hole). Vertices which do not contribute to the shape are kept out of the triangulation. This results in fewer vertices (and hence triangles) in the final model.

The algorithm is described below in pseudo-code.

INPUT
Read in vertices
Read in triples of vertex IDs making up triangles
PROCESSING
Repeat NVERTEX times
   Choose a random vertex, V, which hasn't been chosen before
   Locate set of all triangles having V as a vertex, S
   Order S so adjacent triangles are next to each other
   Re-triangulate triangle set, ignoring V (i.e. remove selected triangles & V and then fill in hole)
   Find the maximum distance between V and the plane of each triangle
   If (distance<threshold)
     Discard V and keep new triangulation
   Else
     Keep V and return to old triangulation
OUTPUT
Output list of kept vertices
Output updated list of triangles The process therefore combines adjacent triangles in the model produced by the marching cubes algorithm, if this can be done without introducing large errors into the model.

The selection of the vertices is carried out in a random order in order to avoid the effect of gradually eroding a large part of the surface by consecutively removing neighboring vertices.

3.6 Further Surface Generation Techniques

Further techniques which may be employed to generate a 3D computer model of an object surface include voxel coloring, for example as described in "Photorealistic Scene Reconstruction by Voxel Coloring" by Seitz and Dyer in Proc. Conf. Computer Vision and Pattern Recognition 1997, pp. 1067–1073, "Plenoptic Image Editing" by Seitz and Kutulakos in Proc. 6th International Conference on Computer Vision, pp. 17–24, "What Do N Photographs Tell Us About 3D Shape?" by Kutulakos and Seitz in University of Rochester Computer Sciences Technical Report 680, January 1998, and "A Theory of Shape by Space Carving" by Kutulakos and Seitz in University of Rochester Computer Sciences Technical Report 692, May 1998.

4. Texturing

The aim of the process is to texture each surface polygon (typically a triangle) with the most appropriate image texture. The output of the process is a VRML model of the surface, complete with texture co-ordinates.

The triangle having the largest projected area is a good triangle to use for texturing, as it is the triangle for which the texture will appear at highest resolution.

A good approximation to the triangle with the largest projected area, under the assumption that there is no substantial difference in scale between the different images, can be obtained in the following way.

For each surface triangle, the image "i" is found such that the triangle is the most front facing (i.e. having the greatest value for $\hat{n}_t \cdot \hat{v}_i$, where $\hat{n}_t$ is the triangle normal and $\hat{v}_i$ is the viewing direction for the "i" th camera). The vertices of the projected triangle are then used as texture co-ordinates in the resulting VRML model.

This technique can fail where there is a substantial amount of self-occlusion, or several objects occluding each other. This is because the technique does not take into account the fact that the object may occlude the selected triangle. However, in practice this does not appear to be much of a problem.

It has been found that, if every image is used for texturing then this can result in very large VRML models being produced. These can be cumbersome to load and render in real time. Therefore, in practice, a subset of images is used to texture the model. This subset may be specified in a configuration file.

REFERENCES i) R. M. Haralick and L. G. Shapiro: *Computer and Robot Vision*, Volume 1, Addison-Wesley, 1992, ISBN 0-201-10877-1 (v.1), section 8.

ii) J. Foley, A. van Dam, S. Feiner and J. Hughes: *Computer Graphics: Principles and Practice*, Addison-Wesley, ISBN 0-201-12110-7.

iii) W. E. Lorensen and H. E. Cline: "Marching Cubes: A High Resolution 3D Surface Construction Algorithm", in *Computer Graphics*, SIGGRAPH 87 proceedings, 21: 163–169, July 1987.

iv) J. Bloomenthal: "An Implicit Surface Polygonizer", Graphics Gems IV, *AP Professional*, 1994, ISBN 0123361559, pp. 324–350.

What is claimed is:

1. An apparatus for generating characterization data characterizing features in an image comprising:
   an image data receiver for receiving data representative of an image;
   a feature detector for detecting the presence of features represented by image data received by said image data receiver, said feature detector being arranged to determine, for image data representative of a plurality of different sized regions of an image, values representative of the presence of features in the regions; and
   an image point characterizer for characterizing image points selected as being representative of features in the image data on the basis of the detection by said feature detector, by calculating characterization values for the features, wherein the characterization values are determined utilizing image data for regions of the image including the feature, and wherein said image point characterizer is arranged to determine said characterization values on the basis of image data for different sized regions, the size of the region being selected on the basis of the size of a said region utilized to detect the feature by said feature detector.

2. Apparatus in accordance with claim 1, wherein said apparatus is arranged to associate with each of the plurality of different sized regions for determination of the presence of features, a size of region to be utilized to determine characterization values for features detected utilizing the different sized regions.

3. Apparatus according to claim 1, wherein said image point characterizer is arranged to select the size of region to be used to calculate the characterization values for a feature from a plurality of predetermined sizes, the selected size increasing as the size of the region used by the feature detector to detect the feature increases.

4. Apparatus according to claim 1, wherein said feature characterizer is arranged to characterize each said region in a manner which is substantially independent of transformations resulting in linear distortions of the portion of the image including that region.

5. Apparatus according to claim 1, wherein said feature characterizer is arranged to characterize each said region in a manner which is substantially independent of rotational transformations of the portion of the image including that region.

6. Apparatus in accordance with claim 5, wherein said feature characterizer is arranged to utilize a substantially circular region to characterize a feature wherein the size of the circular region is selected on the basis of the size of the feature detected by said feature detector.

7. Apparatus in accordance with claim 1, further comprising a correspondence identifier for identifying the correspondence between features in a pair of images, wherein said correspondence identifier is arranged to determine a match between features in the pair of images characterized by said feature characterizer.

8. Apparatus in accordance with claim 1, further comprising:
a data store for storing characterization values for features in a plurality of images; and
a correspondence identifier, said correspondence identifier being arranged to determine a match between characterization values determined by said feature characterizer for data representative of an image received by said image data receiver and stored characterization values stored in said data store.

9. An apparatus for generating a three-dimensional model of an object comprising:
apparatus for identifying a correspondence between features in pairs of images in accordance with claim 7;
a viewpoint determinator for determining on the basis of correspondence of features in pairs of images the relative positions from which the images have been obtained; and
a model generator for generating a three-dimensional model of an object utilizing the image data received by said image data receiver and the relative positions determined by said viewpoint determinator.

10. In an apparatus for generating a three-dimensional computer model of an object by processing images of the object taken from a plurality of different viewpoints to match features in the images, calculating the viewpoints at which the images were recorded using the matched features, and generating a three-dimensional computer model of the surface object using the calculated viewpoints, an improvement comprising matching features in the images by:
storing image data;
detecting the presence of features in the images represented by stored image data utilizing a plurality of different sized regions of the images to determine values representative of the presence of features in the image data;
characterizing image points selected as being representative of features in the image data on the basis of the values, utilizing different sized regions of the images for the image points wherein the size of a region used to characterize an image point is selected on the basis of the size of the region utilized to determine a value representative of the presence of features in the image data for the image point, and
matching the features utilizing the characterizations.

11. In an apparatus for processing data defining images of an object to generate a three-dimensional computer model of the object by matching features in the images, calculating the viewpoints at which the images were recorded using the matched features, and generating a three-dimensional computer model of the surface of the object using the calculated viewpoints, a method of performing the processing to match the features in the images comprising:
storing image data;
detecting the presence of features in the images represented by stored image data utilizing a plurality of different sized regions of the images to determine values representative of the presence of features in the image data;
characterizing image points selected as being representative of features in the image data on the basis of the values, utilizing different sized regions of the images for said image points wherein the size of a region used to characterize an image point is selected on the basis of the size of the region utilized to determine a value representative of the presence of features in the image data for the image point; and
matching the features utilizing the characterizations.

12. A method of generating characterization data characterizing features in an image comprising the steps of:
receiving image data;
detecting the presence of features represented by received image data by determining for image data representative of a plurality of different sized regions of the image, values representative of the presence of features in the regions; and
characterizing image points selected as being representative of features in the image data on the basis of said detection by calculating characterization values for the features, wherein the characterization values are determined utilizing image data for regions of the image centered on the features, and wherein the size of a said region for generating characterization data is selected on the basis of the size of said region utilized to detect said feature.

13. A method in accordance with claim 12, further comprising the steps of:
storing a plurality of sizes of regions for calculating characterization values; and
selecting from the stored sizes the size of regions for calculating characterization values for a feature, wherein the size selected increases as the size of the region used to detect that feature increases.

14. A method in accordance with claim 12, wherein said characterization step comprises generating characterization values which characterize each said region in a manner which is substantially independent of transformations resulting in linear distortions of the portion of the image including said region.

15. A method in accordance with claim 14, wherein said characterization step comprises generating characterization values which characterize each said region in a manner which is substantially independent of rotational transformations of the portion of the image in that region.

16. A method in accordance with claim 15, wherein said characterization step is performed utilizing a substantially circular region to generate characterization values to characterize a feature, and wherein the size of the circular region is selected on the basis of the size of the feature detected in said detection step.

17. A method of identifying the correspondence between features in a pair of images, comprising generating characterization data in accordance with claim 12; and
   determining a match between features in the pair of images characterized in said characterization step.

18. A method in accordance with claim 17, further comprising the step of generating a signal conveying information defining identified correspondences.

19. A method in accordance with claim 18, further comprising the step of recording the signal on a recording medium either directly or indirectly.

20. A method of generating three-dimensional models from images of objects taken from different viewpoints comprising:
   identifying the correspondence between features in images in accordance with claim 17;
   determining the relative positions from which said images were obtained on the basis of the correspondence; and
   generating a three-dimensional model of an object on the basis of the image data and the relative positions.

21. In a method for generating a three-dimensional computer model of an object by processing images of the object taken from a plurality of different viewpoints to match features in the images, calculating the viewpoints at which the images were recorded using the matched features, and generating a three-dimensional computer model of the surface object using the calculated viewpoints, an improvement comprising matching features in the images by:
   storing image data;
   detecting the presence of features in the images represented by stored image data utilizing a plurality of different sized regions of the images to determine values representative of the presence of features in the image data;
   characterizing image points selected as being representative of features in the image data on the basis of the values, utilizing different sized regions of the images for the image points wherein the size of a region used to characterize an image point is selected on the basis of the size of the region utilized to determine a value representative of the presence of features in the image data for the image point; and
   matching the features utilizing the characterizations.

22. Apparatus for generating characterization data characterizing an image comprising:
   a data receiver for receiving image data representative of an image;
   a feature detector for detecting a plurality of features in an image represented by image data received by said data receiver; and
   a feature characterizer for characterizing features detected by said feature detector, said feature characterizer being arranged to characterize portions of image data representative of regions of an image including features detected by said feature detector, wherein said feature characterizer is arranged to generate characterization data for a said region of an image such that the characterization is substantially unaffected by distortions of that region causing stretch and skew,
   wherein said feature detector is arranged to detect a plurality of different sizes of features, and wherein said feature characterizer is arranged to use the size of a feature detected by said feature detector to select the size of a said region used to generate characterization data for a said feature.

23. Apparatus for generating characterization data characterizing an image comprising:
   a data receiver for receiving image data representative of an image;
   a feature detector for detecting a plurality of features in an image represented by image data received by said data receiver; and
   a feature characterizer for characterizing features detected by said feature detector, said feature characterizer being arranged to characterize portions of image data representative of regions of an image including features detected by said feature detector, wherein said feature characterizer is arranged to generate characterization data for a said region of an image such that the characterization is substantially unaffected by distortions of that region causing stretch and skew,
   wherein said feature characterizer is arranged to determine the shape of a region to be used to generate characterization data for a feature on the basis of values of image data for a region of the image including that feature so that the characterization is substantially unaffected by distortions causing stretch and skew of that region of the image.

24. Apparatus for generating characterization data characterizing an image comprising:
   a data receiver for receiving image data representative of an image;
   a feature detector for detecting a plurality of features in an image represented by image data received by said data receiver; and
   a feature characterizer for characterizing features detected by said feature detector, said feature characterizer being arranged to characterize portions of image data representative of regions of an image including features detected by said feature detector, wherein said feature characterizer is arranged to generate characterization data for a said region of an image such that the characterization is substantially unaffected by distortions of that region causing stretch and skew,
   wherein said feature characterizer comprises:
   a luminance determinator for determining the rate of change of luminance along two axes for a said region of the image;
   an image transformer for determining a transformed image utilizing the rates of change of luminance determined by said luminance detector; and
   a characterization generator for generating characterization data characterizing a said region of the image utilizing the transformed image.

25. Apparatus in accordance with claim 23, wherein said data receiver is arranged to receive image data representative of pixels within a said image, and said characterization data generator comprises:
   an average second moment matrix determinator for determining for a said region an averaged second moment matrix for a feature, wherein the averaged second moment matrix comprises a scaled sum of second moment matrices for each pixel in that region, and the second moment matrix for each of the pixels comprises:

$$M = \begin{pmatrix} I_x^2 & I_x I_y \\ I_x I_y & I_y^2 \end{pmatrix}$$

where $I_x$ and $I_y$ are values indicative of the rate of change of luminance of an image along two different axes; and a transformed region determinator for determining for a said region of the image including a said feature a transformed image for that region transformed to account for distortions arising from stretch and skew on the basis of the averaged second moment matrix determined for that region by said average second moment matrix determinator, said characterization data generator being arranged to calculate characterization values for a said feature on the basis of the calculation of rotational invariants determined for a transformed image for that region including the feature transformed by said transformed region determinator.

26. Apparatus in accordance with claim 25, wherein said transformed region determinator is arranged to determine a transformed image by interpolating values for an inverse square root of a second moment matrix determined by said average second moment matrix determinator for that region to determine a transformed image representative of the region of the original image transformed by the square root of the second moment matrix multiplied by a scaling factor.

27. Apparatus in accordance with claim 26, wherein the scaling factor is inversely proportional to the square root of the determinant of the averaged second moment matrix for a said region.

28. Apparatus in accordance with claim 27, wherein said transformed region determinator is arranged to generate transformed image data for a said region of the image until the calculated second moment matrix determined by said second moment matrix determinator for the transformed image is equal to identity, and wherein said feature characterizer is arranged to characterize a said feature on the basis of the iteratively transformed image data.

29. Apparatus in accordance with claim 22, further comprising a feature associater for identifying matches between features in pairs of images, wherein said feature associator is arranged to determine a match between features in pairs of images on the basis of characterization by said feature characterizer of features in the pair of images.

30. Apparatus in accordance with claim 29, further comprising:
a data store for storing characterization data for features in a plurality of images; and
a feature associator, said feature associator being arranged to determine, utilizing the characterization of features of received image data characterized by said feature characterizer, a match between features in the received image data and features defined by characterization values stored in said data store.

31. A method for generating characterization data characterizing an image comprising the steps of:
receiving image data representative of an image;
detecting a plurality of features in the image; and
generating characterization data, characterizing the features by generating data characterizing portions of the image data representative of regions of images including the features, wherein said generation step is such that the characterization data generated is substantially unaffected by distortions of the regions including the features causing stretch and skew,
wherein said determination step comprises detecting a plurality of different sized features, and wherein said characterization step includes selecting the size of a region to characterize a said feature on the basis of the size of a said feature.

32. A method in accordance with claim 31, wherein said generation step comprises for each of the features determining the shape of a region to be used to characterize a said feature on the basis of values of image data for a region of the image including that feature so that said characterization is substantially unaffected by transformations resulting in linear distortions of the region of the image.

33. A method in accordance with claim 31, wherein said generation step comprises the steps of:
determining the rate of change of luminance along two axes for said regions of the images;
determining transformed images utilizing the rates of change of luminance; and
generating characterization data for the features utilizing the transformed images.

34. A method in accordance with claim 32, wherein said characterization step comprises the steps of:
determining for a said region of an image including a feature an averaged second moment matrix for the feature, wherein the averaged second moment matrix comprises a scaled sum of second moment matrices for each pixel in that region, and the second moment matrix for each of the pixels comprises:

$$M = \begin{pmatrix} I_x^2 & I_x I_y \\ I_x I_y & I_y^2 \end{pmatrix}$$

where $I_x$ and $I_y$ are values indicative of the rate of change of luminance of an image along two different axes; and
determining for that region of the image including the feature a transformed image transformed to account for distortions arising from sketch and skew on the basis of the second moment matrix determined for that region; and
calculating characterization values for a feature on the basis of the calculation of rotational invariants determined for the transformed image.

35. A method in accordance with claim 34, wherein the determination of a transformed image comprises determining a transformed image corresponding to the selected region transformed by the square root of the second moment matrix for that region scaled by a scaling factor.

36. A method in accordance with claim 35, wherein the scaling factor is proportional to the square root of the determinant of the second moment matrix determined for that region.

37. A method in accordance with claim 36, wherein the determination of a transformed image comprises determining a transformed image by interpolating values for the origins of pixels in the transformed image transformed by the inverse square root of the second moment matrix multiplied by a scaling factor, to determine a transformed image representative of the original image region transformed by the square root of the second moment matrix multiplied by a scaling factor, wherein the scaling factor is inversely proportional to the determinant of the second moment matrix for a said feature.

38. A method in accordance with claim 37, wherein said transformation step comprises iteratively generating transformed image data for a said region of the image until the calculated second moment matrix for the transformed image is substantially equal to identity, and said characterization comprises characterizing the feature on the basis of the iteratively transformed image data.

39. An apparatus for identifying features in images comprising:
an image receiver for receiving data representative of an image;
a feature detector for detecting the presence of features in the image represented by image data received by said image receiver, said feature detector being arranged to determine, for image data representative of a plurality of different sized regions of the image, values representative of the presence of features in the regions; and
a selector for selecting image points as being representative of features in the image data on the basis of said detection by said feature detector,
wherein said feature detector is arranged to scale the values indicative of the presence of a feature in an image to account for variation in the values arising due to the size of the region used to determine the values.

40. An apparatus in accordance with claim 39, wherein said feature detector is arranged to scale the values by changing each of the values utilizing scaling factors proportional to the areas of regions used to determine the values.

41. An apparatus in accordance with claim 40, wherein said feature detector is arranged to scale the values by dividing each of the values by the scaling factors.

42. An apparatus in accordance with claim 39, wherein said selector is arranged to select points as being representative of features within images on the basis of the scaled values generated by said feature detector which exceed a predetermined threshold.

43. Apparatus in accordance with claim 39, wherein said selector is arranged to select a predetermined number of image points as being representative of features by comparing scaled values determined by said feature detector and selecting points being associated with values most strongly indicative of the presence of features.

44. Apparatus in accordance with claim 39, wherein said feature detector is arranged to determine the value for a region utilizing an averaged value indicative of the presence of a feature in an image calculated for a said region of the image, and to scale the determined value.

45. An apparatus in accordance with claim 44, wherein said feature detector is arranged to, for each of the plurality of different sized regions:
(a) determine a smoothed image wherein each of the values for pixels in the smoothed image are determined on the basis of an averaged value for pixels in that region in the original image;
(b) to determine characterization values for each of the pixels in the smoothed image indicative of the presence of a feature in that region; and
(c) to determine from pixels in the smoothed image a value indicative of an averaged characterization value for a region of the smoothed image, the size of the smoothed image region being proportional to the size of the region used to generate the smoothed image.

46. Apparatus in accordance with claim 45, wherein the characterization values comprise values indicative of the rate of change of luminance of pixels in the smoothed image.

47. Apparatus in accordance with claim 46, wherein said feature detector is arranged to generate the values indicative of the presence of a said feature by calculating values for Harris corner strengths for the points, divided by a scaling factor proportional to the square of the area of the region of image used to determine the Harris corner strengths.

48. Apparatus in accordance with claim 39, further comprising a feature characterizer for characterizing image points selected by said selector, said feature characterizer being arranged to characterize a selected image point on the basis of image data representative of a region of the image including the selected image point.

49. Apparatus in accordance with claim 48, wherein said feature characterizer is arranged to vary the size of a said region for characterizing an image point so that the size of said region is proportional to the size of the region utilized by the feature detector to determine a value which resulted in the selection by said selector of the image point, included in said region.

50. Apparatus in accordance with claim 49, wherein said feature characterizer is arranged to said characterize the region in a manner which is substantially independent of affine transformations of the image data of the region.

51. Apparatus in accordance with claim 48, further comprising a match identifier for identifying matches between features in a pair of images, wherein said match identifier is arranged to determine a match between image points in the pair of images characterized by said feature characterizer.

52. Apparatus in accordance with claim 50, further comprising a data store for storing characterization values associated with image points in a plurality of images, and a match identifier, said match identifier being arranged to determine on the basis of characterization of features by said feature characterizer matches between image points in the image data received by said image receiver and image points associated with characterization values stored in said data store.

53. An apparatus for generating a three-dimensional computer model of an object comprising:
apparatus for identifying matches between features in pairs of images in accordance with claim 51;
a viewpoint determinator for determining on the basis of the matches the relative view points from which the images have been obtained; and
a model generator for generating a three-dimensional computer model of an object utilizing the image data received by said image receiver and the determination of the relative view points from which the image data has been obtained determined by said viewpoint determinator.

54. In an apparatus for generating a three-dimensional computer model of an object by processing images of the object taken from a plurality of different viewpoints to match features in the images, calculating the viewpoints at which the images were recorded using the matched features, and generating a three-dimensional computer model of the surface object using the calculated viewpoints, an improvement comprising matching features in the images by:
storing image data;
detecting the presence of features in the images represented by the stored data, by determining, for image data representative of a plurality of different sized regions of a given image from among the images, values representative of the presence of features in the regions, and scaling the values to account for variation in the values arising due to the size of the region used to determine the values; and selecting image points as being representative of features in the image data on the basis of the scaled values.

55. In an apparatus for processing data defining images of an object to generate a three-dimensional computer model of the object by matching features in the images, calculating the viewpoints at which the images were recorded using the matched features, and generating a three-dimensional computer model of the surface of the object using the calculated viewpoints, a method of performing the processing to match the features in the images comprising:

storing image data;

detecting the presence of features in the images represented by stored image data, comprising determining for image data representative of a plurality of different sized regions of a given image from among the images, values representative of the presence of features in the regions, and scaling the values to account for variation in the values arising due to the size of the region used to determine the values; and selecting image points as being representative of features in the image data on the basis of the scaled values.

56. A method for identifying features in images comprising the steps of:

storing image data;

detecting the presence of features in images represented by stored image data, said detection step comprising determining for image data representative of a plurality of different sized regions of a given image from among the images, values representative of the presence of features in the regions; and selecting image points as being representative of features in the image data on the basis of said detection step, wherein said detection step includes the step of scaling the values indicative of the presence of a feature in an image to account for variation in the values arising due to the size of the region used to determine the values.

57. A method in accordance with claim 56, wherein said scaling step comprises changing each of the values utilizing scaling factors proportional to the areas of the regions used to determine the values.

58. A method in accordance with claim 57, wherein said scaling step comprises scaling the values by dividing each of the values by the scaling factors.

59. A method in accordance with claim 56 wherein said selection step comprises selecting image points as being representative of features on the basis of the scaled values determined for a region including a said point exceeding a predetermined threshold.

60. A method in accordance with claim 56, wherein said selection step comprises selecting a predetermined number of image points as being representative of features by comparing scaled values determined for regions and selecting points associated with values most strongly indicative of the presence of features.

61. A method in accordance with claim 56, wherein said detection step comprises determining the value for a region utilizing an averaged value indicative of the presence of a feature in an image calculated for a said region of the given image, and scaling the determined value.

62. A method in accordance with claim 61, wherein said detection step comprises, for each of the plurality of different sized regions;

(a) determining a smoothed image wherein each of the values for pixels in the smoothed image are determined on the basis of an averaged value for pixels in that region in the original image;

(b) determining characterization values for each of the pixels in the smoothed image indicative of the presence of a feature in that region; and (c) determining from pixels in the smoothed image a value indicative of an averaged characterization value for a region of the smoothed image, the size of the smoothed image region being proportional to the size of the region used to generate the smoothed image.

63. A method in accordance with claim 62, wherein said characterization values comprise values indicative of the rate of change of luminance of pixels in the smoothed image.

64. A method in accordance with claim 63, wherein said detection step includes generating values indicative of the presence of a said feature by calculating values for Harris corner strengths for the points, divided by a scaling factor proportional to the square of the area of the region of image used to determine the Harris corner strength.

65. A method of characterizing features in images comprising the steps of selecting image points in accordance with claim 56, and characterizing features, on the basis of image data representative of regions of the image including the image points.

66. A method in accordance with claim 65, wherein said characterization step comprises selecting the size of a said region for characterizing a feature so that the size of a region for characterizing a feature is proportional to the size of the region utilized to determine a value utilized to select the image point, included in that region.

67. A method in accordance with claim 56, wherein said characterization step comprises characterizing that region in a manner which is substantially independent of affine transformations of the image data of that region.

68. A method of identifying the correspondence between features in pairs of images comprising the steps of:

characterizing features in images in accordance with claim 65; and identifying correspondence between features in a pair of images on the basis of the characterization in said characterization step.

69. A method in accordance with claim 68, further comprising the step of generating a signal conveying information defining identified correspondences.

70. A method in accordance with claim 69, further comprising the step of recording the generated signal on a recording medium either directly or indirectly.

71. A method of selecting an image from a database of images comprising the steps of:

storing characterization values for features in a plurality of images stored in a database;

characterizing an image in accordance with claim 65; and selecting an image from an image database on the basis of a comparison of the characterization of that image and the stored characterization values for features in images in the image database.

72. A method of generating a three-dimensional model of an object comprising the steps of:

identifying a correspondence between features in pairs of images in accordance with claim 68;

determining on the basis of the correspondence of features in a pair of images the relative view points from which the images have been obtained; and generating a three-dimensional model of an object utilizing the image data and the determination of the relative view points from which the image data has been obtained.

73. In a method of generating a three-dimensional computer model of an object by processing images of the object taken from a plurality of different viewpoints to match features in the images, calculating the viewpoints at which the images were recorded using the matched features, and generating a three-dimensional computer model of the surface object using the calculated viewpoints, an improvement comprising matching features in the images by:

storing image data;

detecting the presence of features in the images represented by stored image data, comprising determining for image data representative of a plurality of different sized regions of a given image from among the images, values representative of the presence of features in the regions, and scaling the values to account for variation in the values arising due to the size of the region used to determine the values; and selecting image points as being representative of features in the image data on the basis of the scaled values.

74. An apparatus for generating characterization data characterizing features in an image comprising:

input means for receiving data representative of an image;

detection means for detecting the presence of features represented by image data received by said input means, said detection means being arranged to determine, for image data representative of a plurality of different sized regions of the image, values representative of the presence of features in the regions; and characterization means for characterizing image points selected as being representative of features in the image data on the basis of the detection by said detection means, by calculating characterization values for the features, wherein the characterization values are determined utilizing image data for regions of the image including the feature, and wherein said characterization means is arranged to determine the characterization values on the basis of image data for different sized regions, the size of a given region being selected on the basis of the size of a said region utilized to detect the feature by said detection means.

* * * * *

UNITED STATES PATENT AND TRADEMARK OFFICE
CERTIFICATE OF CORRECTION

PATENT NO. : 6,975,755 B1
APPLICATION NO. : 09/718343
DATED : December 13, 2005
INVENTOR(S) : Adam Michael Baumberg It is certified that error appears in the above-identified patent and that said Letters Patent is hereby corrected as shown below:

COLUMN 6:

Line 55, "enabling" should read --enabling it--.

COLUMN 12:

Line 42, "centred" should read --centered--.

COLUMN 18:

Line 65, "trans formation" should read --transformation--.

COLUMN 20:

Line 16, "Re($U_{n,0}$)" should read --Re($U'_{n,0}$)--.

COLUMN 25:

Line 34, "$V_{0,2}U^*_{0,2}/U_{0,2}|$" should read --$V_{0,2}=*U_{0,2}/|U_{0,2}|$--.

COLUMN 29:

Line 8, "a $U^G_{0,m}$" should read --$U^G_{0,m'}$--.
Line 15, "$U^G_{0,m}$" should read --$U^G_{0,m'}$--.

COLUMN 35:

Line 32, "$X_{n+1}=\theta_{n+1,n}X$" should read --$X_{n+1}=\theta_{n+1,n}X_n$--.

COLUMN 36:

Line 35, "$\sigma_o^2 200$" should read --$\sigma_o^2=200$--.

UNITED STATES PATENT AND TRADEMARK OFFICE
CERTIFICATE OF CORRECTION

PATENT NO. : 6,975,755 B1
APPLICATION NO. : 09/718343
DATED : December 13, 2005
INVENTOR(S) : Adam Michael Baumberg It is certified that error appears in the above-identified patent and that said Letters Patent is hereby corrected as shown below:

COLUMN 38:

Line 18, "pixels $\leq$" should read --pixels $\geq$--.

COLUMN 47:

Line 55, "determine" should read --to determine--.

COLUMN 48:

Line 24, "said" should be deleted.

Signed and Sealed this

Fifth Day of September, 2006

JON W. DUDAS
*Director of the United States Patent and Trademark Office*